(12) United States Patent
Wang et al.

(10) Patent No.: US 11,595,973 B2
(45) Date of Patent: Feb. 28, 2023

(54) METHOD FOR PROCESSING UPLINK CONTROL INFORMATION AND TERMINAL

(71) Applicant: Samsung Electronics Co., Ltd., Suwon-si (KR)

(72) Inventors: Yi Wang, Beijing (CN); Shichang Zhang, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 16/763,460

(22) PCT Filed: Nov. 15, 2018

(86) PCT No.: PCT/KR2018/013984
§ 371 (c)(1),
(2) Date: May 12, 2020

(87) PCT Pub. No.: WO2019/098697
PCT Pub. Date: May 23, 2019

(65) Prior Publication Data
US 2020/0367265 A1    Nov. 19, 2020

(30) Foreign Application Priority Data
Nov. 16, 2017  (CN) .......................... 201711140827.2
May 21, 2018   (CN) .......................... 201810490588.1

(51) Int. Cl.
*H04W 4/00*    (2018.01)
*H04W 72/12*   (2023.01)
(Continued)

(52) U.S. Cl.
CPC ....... *H04W 72/1242* (2013.01); *H04L 1/1819* (2013.01); *H04L 5/0055* (2013.01);
(Continued)

(58) Field of Classification Search
CPC ......... H04W 72/1242; H04W 72/1268; H04W 72/0413
See application file for complete search history.

(56) References Cited

U.S. PATENT DOCUMENTS

2012/0113831 A1   5/2012  Pelletier et al.
2012/0230268 A1   9/2012  Marinier et al.
(Continued)

FOREIGN PATENT DOCUMENTS

EP    2 530 896 A2    5/2012
EP    2 536 050 A2    12/2012
(Continued)

OTHER PUBLICATIONS

On Simultaneous PUSCH and PUCCH Transmissions, 3GPP Draft; R1-1710711 PUCCH PUSCH, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051299917.

(Continued)

*Primary Examiner* — Bo Hui A Zhu
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method for processing uplink control information (UCI) and a terminal. The method for processing UCI includes: determining the (Continued)

UCI which overlaps with a Physical Uplink Shared Channel (PUSCH) resource in time domain according to the PUSCH resource; determining whether to transmit the UCI, and performing corresponding processing based on a determination result. The present disclosure realizes effective transmission of UCI to be transmitted, and improves transmission efficiency.

20 Claims, 6 Drawing Sheets

(51) Int. Cl.
    *H04W 76/27*     (2018.01)
    *H04L 1/1812*     (2023.01)
    *H04L 5/00*     (2006.01)
    *H04W 72/04*     (2023.01)
    *H04W 72/1268*     (2023.01)

(52) U.S. Cl.
    CPC ..... *H04W 72/042* (2013.01); *H04W 72/0413* (2013.01); *H04W 72/1268* (2013.01); *H04W 76/27* (2018.02)

(56) References Cited

U.S. PATENT DOCUMENTS

| | | |
|---|---|---|
| 2012/0320826 A1 | 12/2012 | Kim et al. |
| 2012/0327875 A1 | 12/2012 | Han et al. |
| 2013/0114391 A1 | 5/2013 | Jang et al. |
| 2013/0148592 A1 | 6/2013 | Noh et al. |
| 2014/0192738 A1 | 7/2014 | Nam et al. |
| 2014/0362832 A1* | 12/2014 | Rudolf ................. H04L 1/1678 370/336 |
| 2015/0036618 A1 | 2/2015 | Xu et al. |
| 2017/0374656 A1 | 12/2017 | Kim et al. |
| 2018/0199314 A1 | 7/2018 | Takeda et al. |
| 2019/0281618 A1* | 9/2019 | Zhao ................. H04W 72/1268 |
| 2020/0008158 A1* | 1/2020 | Yamamoto .......... H04W 52/325 |
| 2020/0037314 A1* | 1/2020 | Xiong ................. H04L 5/0091 |

FOREIGN PATENT DOCUMENTS

| | | |
|---|---|---|
| EP | 3 297 367 A1 | 3/2018 |
| KR | 10-2015-0106398 A | 9/2015 |
| WO | 2011/137408 A2 | 11/2011 |
| WO | 2016/108665 A1 | 7/2016 |
| WO | 2017/010477 A1 | 1/2017 |

OTHER PUBLICATIONS

European Search Report dated Nov. 11, 2020, issued in European Application No. 18878971.3-1205 / 3695559.
European Notice of Allowance dated Oct. 14, 2022; European Appln. No. 18 878 971.3-1213.
Korean Office Action with English translation dated Nov. 29, 2022; Korean Appln. No. 10-2020-7013787.

* cited by examiner

METHOD FOR PROCESSING UPLINK CONTROL INFORMATION AND TERMINAL

TECHNICAL FIELD

The present disclosure relates to the field of communications technology, and in particular, to a method for processing uplink control information and a terminal.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The rapid development of information industry, particularly the increasing demand from the mobile Internet and the Internet of Things (IoT), brings about unprecedented challenges in the future mobile communications technology. According to the ITU-R M.[IMT. BEYOND 2020. TRAFFIC] issued by the International Telecommunication Union (ITU), it can be expected that, by 2020, mobile services traffic will grow nearly 1,000 times as compared with that in 2010 (4G era), and the number of user device connections will also be over 17 billion, and with a vast number of IoT devices gradually expand into the mobile communication network, the number of connected devices will be even more astonishing.

In response to this unprecedented challenge, the communications industry and academia have prepared for 2020s by launching an extensive study of the fifth-generation mobile communications technology (5G). Currently, in ITU-R M.[IMT.VISION] from ITU, the framework and overall objectives of the future 5G have been discussed, where the demands outlook, application scenarios and various important performance indexes of 5G have been described in detail. In terms of new demands in 5G, the ITU-R M.[IMT. FUTURE TECHNOLOGY TRENDS] from ITU provides information related to the 5G technology trends, which is intended to address prominent issues such as significant improvement on system throughput, consistency of the user experience, scalability to support IoT, time delay, energy efficiency, cost, network flexibility, support for emerging services and flexible spectrum utilization, etc. In 3GPP, the first phase of work on 5G is already in progress. In order to support more flexible scheduling, 3GPP decides to support dynamic scheduling-based uplink and downlink transmission which is similar to LTE and semi-persistent scheduling (SPS) transmission in 5G, and 5G also supports Grant free/grant less UL transmission (hereinafter abbreviated as GF uplink transmission) without dynamic scheduling signaling, for supporting various delay request services, for example, to support Ultra-Reliable and Low Latency Communications (URLLC). GF uplink transmission semi-statically configures available GF uplink transmission resources, such as time resources (occupies slots with specific periods or patterns), frequency domain resources (e.g., Physical Resource Blocks (PRB)) and code domain resources (e.g., sequences or codewords used by pilot symbols), through higher layer signaling (e.g., Radio Resource Control (RRC)), or may also configure modulation modes (e.g., (Modulation and Coding Scheme (MCS)), etc. One type of GF uplink transmission (referred to as Type 1 GF uplink transmission for short), after the RRC configuration is completed, an uplink transmission may be performed on the configured resources; another type of GF uplink transmission (referred to as Type 2 GF uplink transmission for short), after the RRC configuration is completed and activation signaling is received (e.g., activation signaling carried through the physical layer DCI), that is, the uplink transmission may be performed on the configured resources. However, upon receiving deactivation signaling, the uplink transmission on the resource is stopped. The base station may configure whether the uplink transmission may perform multiple consecutive transmissions through RRC signaling or the activation signaling. For example, the base station may configure K consecutive transmissions for a same transport block (TB). The resources occupied by the K transmissions may be close to each other or dispersed.

The uplink transmission usually includes uplink data transmission, uplink control signal transmission, uplink reference signal transmission and uplink random access signal transmission. The uplink data is often carried through a Physical Uplink Shared Channel (PUSCH), and the uplink control signal is carried through a PUSCH or a Physical Uplink Control Channel (PUCCH). When the uplink control signal is transmitted on the PUSCH or the PUCCH, it depends on various factors. For example, whether uplink control information (UCI) is present simultaneously with the uplink data, and whether a user terminal may simultaneously transmit the PUSCH, the PUCCH, or the like. For a PUSCH based on dynamic scheduling, the base station may more reasonably allocate resources of the PUSCH, so that the uplink data and/or UCI are transmitted at a relatively ideal modulation and coding rate. However, there is no effective method for how the UCI determined when the user terminal has started to prepare the PUSCH is appended to the PUSCH for transmission. In addition, since the resources for GF uplink transmission are semi-statically configured and the base station may not be able to decide whether the user terminal should transmit the uplink data, it is difficult for the base station to adjust the PUSCH resources according to the UCI and the uplink data to be transmitted. There is a need for a method for ensuring efficient transmission of the uplink data and the UCI. Moreover, for GF uplink transmission, dynamic UL grant is not required, and the base station may not indicate dynamic adjustment information related to the UCI, such as the overhead of the UCI. Therefore, a new mechanism is also needed to ensure the effective transmission of the UCI.

In addition, in order to increase the success rate of the uplink transmission, for scheduling-based uplink transmission, the base station may also configure the user equipment to perform K consecutive transmissions for the same TB. For scheduling-based K consecutive transmissions or K consecutive transmissions of the GF, a new mechanism is also needed to support transmitting the UCI on one or more PUSCHs on the K PUSCHs.

DISCLOSURE OF INVENTION

Technical Problem

The purpose of the present disclosure is to solve at least one of the above-mentioned technical defects, and in particular how to implement the effective transmission problem of uplink information.

Solution to Problem

The present disclosure provides a method for processing uplink control information (UCI), comprising the following steps:
determining the UCI which overlaps with a Physical Uplink Shared Channel (PUSCH) resource in time domain according to the PUSCH resource;
determining whether to transmit the UCI, and performing corresponding processing based on a determination result.

Preferably, the UCI comprises a first type of UCI and/or a second type of UCI;
the first type of UCI comprises UCI that has been determined to be transmitted on the PUSCH in a slot which is no later than a reference slot; the second type of UCI comprises UCI that is necessary to be transmitted on a resource overlapping with the PUSCH in time domain and determined after the reference slot.

Preferably, the determination of the reference slot comprises any of the followings:
the reference slot is a slot in which uplink control signaling for scheduling the PUSCH is received;
the reference slot is a slot before the slot of the PUSCH resource, and a difference between the reference slot and the slot of the PUSCH resource is predefined or configured by a base station.

Preferably, a way for determining whether to transmit the UCI comprises any one of the followings:
without transmitting the UCI;
transmitting the UCI;
determining whether to transmit the UCI according to priority information preconfigured or configured by the base station;
determining whether to transmit the UCI according to preconfigured threshold information.

Preferably, the determining whether to transmit the UCI according to priority information preconfigured or configured by a base station includes:
determining whether the UCI has a highest priority; if the UCI has the highest priority, transmitting the UCI; otherwise, not transmitting the UCI.

Preferably, the UCI includes a Hybrid Automatic Repeat reQuest acknowledgement (HARQ-ACK) and/or an uplink scheduling request (SR).

The configuration manner of the priority information configured by the base station includes any one of the followings:
a priority of the uplink data configured when the base station configures the uplink data is higher than a priority of the ACK/NACK of the Physical Downlink Shared Channel (PDSCH);
a priority of the SR configured by the base station when configuring the SR resource;
a priority relationship between the SR and the PUSCH configured by the base station when configuring the PUSCH;
a priority relationship between the SR and the PUSCH determined according to the indication of a MAC layer.

Preferably, if the UCI comprises a Hybrid Automatic Repeat reQuest acknowledgement (HARQ-ACK), the preconfigured priority information is a first preset priority;
the way for determining the first preset priority comprises any of the followings:
a priority of uplink data carried by the PUSCH is higher than a priority of ACK/NACK corresponding to Physical Downlink Shared Channel (PDSCH);
a priority of the ACK/NACK corresponding to the PDSCH is higher than the priority of the uplink data carried by the PUSCH;
a priority of the ACK/NACK carried by short Physical Uplink Control Channel (sPUCCH) is higher than the priority of the uplink data carried by the PUSCH; wherein, the short PUCCH is a PUCCH whose symbol length is less than a preset threshold;
a priority of uplink data carried by the PUSCH based on a non-slot-based scheduling is higher than a priority of the ACK/NACK of the PDSCH based on a slot-based scheduling;
a priority of the ACK/NACK of the PDSCH based on the non-slot-based scheduling is higher than a priority of the uplink data carried by the PUSCH based on a slot-based scheduling;

a priority of the ACK/NACK of the PDSCH based on the non-slot-based scheduling is higher than the priority of the uplink data carried by the PUSCH based on the non-slot-based scheduling;

if the first type of UCI is included in the PUSCH, and HARQ-ACK is included in the first type of UCI, the priority of the PUSCH is higher than the priority of the ACK/NACK of the PDSCH.

Preferably, if the UCI comprises an uplink scheduling request (SR), the pre-configured priority information is a second preset priority;

the way for determining the second preset priority comprises any of the followings:

a priority of the SR used for Ultra-Reliable and Low Latency Communications (URLLC) service is higher than the priority of the uplink data carried by the PUSCH;

If an SR period is less than an uplink transmission period for a GF PUSCH, the priority of the SR is higher than the priority of the uplink data carried by the PUSCH;

a priority of the SR carried through the short PUCCH is higher than a priority of the uplink data.

a priority of the SR carried through the short PUCCH is higher than the priority of the uplink data based on slot-based scheduling;

wherein, the short PUCCH is a PUCCH whose symbol length is less than a threshold.

Preferably, the performing corresponding processing based on the determination result, includes:

transmitting the UCI based on the determination result; and not transmitting the UCI based on the determination result.

Preferably, the transmitting the UCI based on the determination result, includes:

determining a channel resource carrying the UCI; and transmitting the UCI according to determined channel resource.

Preferably, the way for determining the channel resource carrying the UCI includes any one of the followings:

carrying the UCI on the PUSCH in a first slot through a first puncturing manner; and determining to carry the UCI on the PUSCH by scheduling indication information for indicating the total number of bits of the UCI in UL grant of the PUSCH;

carrying the UCI through the uplink control channel (PUCCH).

Preferably, the carrying the UCI on the PUSCH in a first slot through a first puncturing manner includes any one of the followings:

if puncturing is performed on a PUSCH resource of a PUSCH corresponding to an OFDM symbol that is expected to be transmitted by the UCI, mapping the UCI onto the PUSCH resource;

if the OFDM symbol that is expected to be transmitted by the UCI is on the predefined PUSCH resource within the OFDM symbol next to the DMRS symbol closest to the OFDM symbol in the PUSCH, mapping the UCI onto the PUSCH resource by puncturing the PUSCH resource; wherein, the closest DMRS symbol is no later than a starting OFDM symbol of the UCI resource;

If the OFDM symbol that is expected to be transmitted by the UCI is no later than a last set of pilot symbols of the PUSCH, mapping the UCI onto the PUSCH resource by puncturing the PUSCH on the PUSCH resource predefined within the OFDM symbol next to the last set of the pilot symbols; and mapping the UCI onto the frequency domain resource by puncturing the PUSCH on a predefined frequency domain resource corresponding to the last symbol or at least two OFDM symbols of the PUSCH.

Preferably, the determining to carry the UCI on the PUSCH by scheduling indication information for indicating the total number of bits of the UCI in UL grant of the PUSCH includes any one of the followings:

determining the total number of bits of the HARQ-ACK carried in the first slot of the PUSCH according to indication information for indicating the total number of bits of the UCI;

determining the total number of bits of the HARQ-ACK carried in the each slot of the PUSCH according to indication information for indicating the total number of bits of the UCI, and the total number of bits of the HARQ-ACK in each slot is the same.

Preferably, the way for determining to carry a PUCCH resource in the UCI through PUCCH, includes any one of the followings:

If the UCI includes an HARQ-ACK, determining the PUCCH resource according to the PUCCH resource configured by the base station or according to the PUCCH configured by the base station and PUCCH resource indication information in DL assignment;

If the UCI includes an SR, determining to transmit the PUCCH resource according to a period and time offset configured by the base station.

Preferably, the transmitting the UCI according to the determined channel resource comprises:

if the determined channel resource is a PUSCH resource and/or a PUCCH resource, transmitting the UCI according to the determined PUSCH resource and/or PUCCH resource.

Preferably, when the determined channel resource is a PUSCH resource, further comprising:

Transmitting the first type of UCI and uplink data carried by the PUSCH according to the determined PUSCH resource.

Preferably, the determined channel resource is a PUCCH resource, further comprising:

a process for determining whether to transmit the first type of UCI on the PUCCH comprises any one of the followings:

if the total number of bits of the first type of UCI and the UCI is greater than a preset total number of bits threshold or a preset maximum coding rate, transmitting the UCI while not transmitting the first type of UCI;

if the total number of bits of the first type of UCI and the UCI is greater than a preset total number of bits threshold or a preset maximum coding rate, compressing the first type of UCI according to a predefined rule, and transmitting the UCI and the compressed first type of UCI; and if the total number of bits of the first type of UCI and the UCI is greater than a preset total number of bits threshold or a preset maximum coding rate, transmitting the UCI and part of the first type of UCI according to the predefined rule.

Preferably, the preconfigured threshold information comprises any one of the followings:

a maximum coding rate for the UCI and/or the first type of UCI;

preconfigured parameters for controlling the number of physical resources occupied by the UCI and/or the first type of UCI;

a maximum coding rate for uplink data transmission;

preconfigured parameters for controlling the minimum number of resources required for uplink data transmission.

Preferably, not transmitting the UCI based on the determination result, includes:

transmitting a first type of UCI and uplink data carried by the PUSCH according to the determined PUSCH source.

Preferably, the way for determining the UCI which overlaps with the determined PUSCH resource in time domain according to the determined PUSCH resource comprises any one of the followings:

determining the UCI according to the HARQ-ACK timing; and determining the UCI according to a period and time offset of periodic UCI.

The present disclosure also provides a terminal, comprising:

a first processing unit, configured to determine the UCI which overlaps with Physical Uplink Shared Channel (PUSCH) resource in time domain according to the PUSCH resource;

a second processing unit, configured to determine whether to transmit the UCI, and perform corresponding processing based on a determination result.

The present disclosure also provides a terminal device, comprising a memory and a first processor, the memory configured to store a computer program, the computer program implements steps of above methods for processing uplink control information while executing by the first processor.

Advantageous Effects of Invention

In the present disclosure, by determining the UCI which overlaps with a PUSCH resource in time domain according to the PUSCH resource, the determination of the UCI to be transmitted is achieved; then by determining whether to transmit the UCI and performing corresponding processing based on the determination result, effective transmission of the UCI to be transmitted is achieved, and transmission efficiency is improved.

Additional aspects and advantages of the invention will be set forth in part in the description which follows and in part will become apparent from the description, or may be learned by practice of the invention.

MODE FOR THE INVENTION

Figure 1:
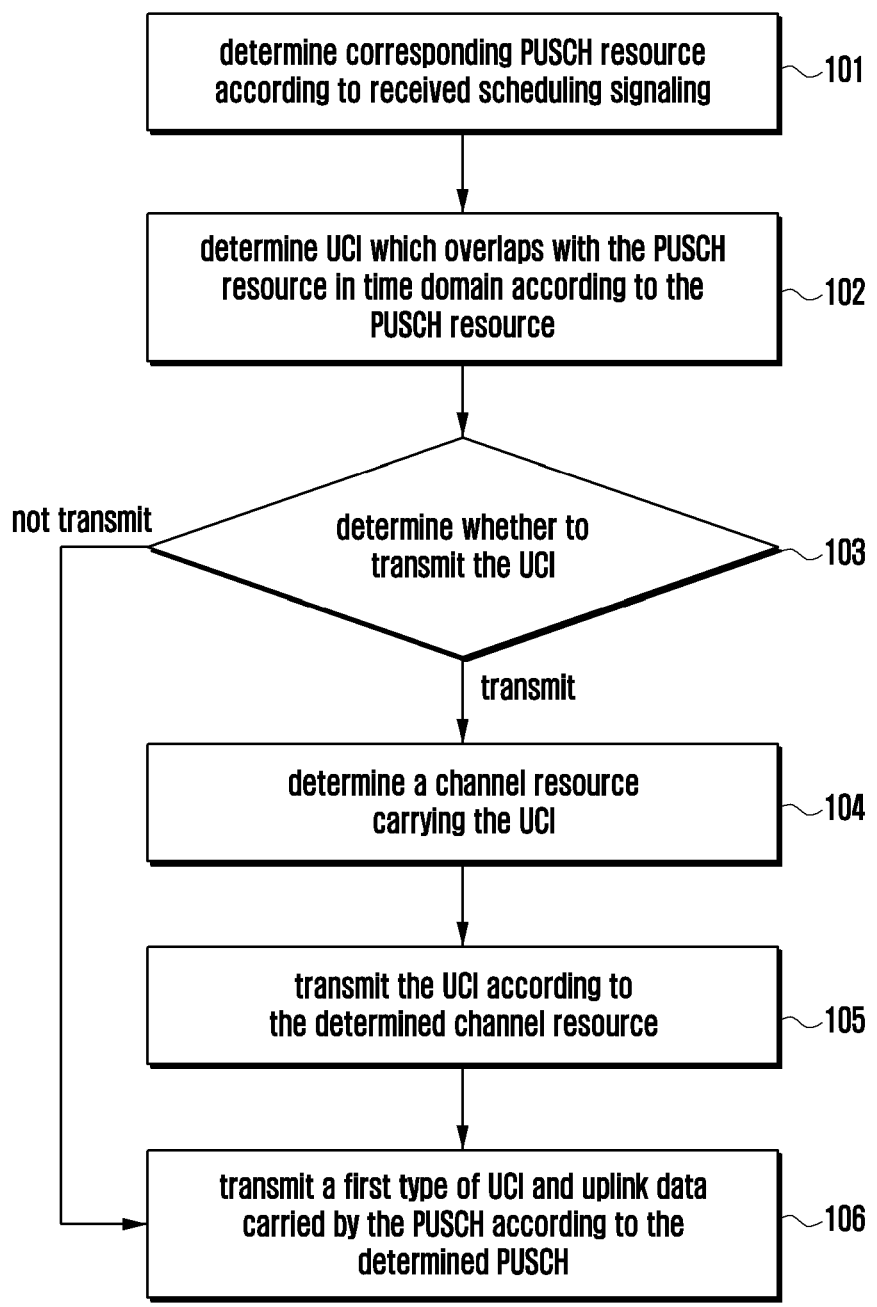
FIG. 1 is a flowchart of a method for processing UCI according to the present disclosure.

Embodiments of the present disclosure will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present invention and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skill in the art to which the present invention belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "terminal" and "terminal apparatus" as used herein compasses not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

The present disclosure provides a method for processing uplink control information (UCI). As shown in FIG. 1, the method includes the following steps:

Step 101: determining a corresponding physical uplink shared channel (PUSCH) resource according to received scheduling signaling.

Step 102: determining UCI that overlaps with the PUSCH resource in time domain according to the PUSCH resource.

The way for determining UCI that overlaps with the PUSCH resource in time domain according to the PUSCH resource, includes any of the followings:

1) determining the UCI according to Hybrid Automatic Repeat reQuest acknowledgement (HARQ-ACK) timing.

2) determining the UCI according to a period and time offset of periodic UCI, for example, determining the UCI by a period and time offset of periodic channel state information CSI or an uplink scheduling request (SR).

Wherein, the above UCI includes a first type of UCI and/or a second type of UCI.

The second type of UCI includes UCI that is to be transmitted on a resource that overlaps with the PUSCH in time domain and is determined after the reference slot m. It can be understood that the UCI that needs to be transmitted on the uplink resource that overlaps with the PUSCH in time domain and is determined after the user starts to prepare to generate the PUSCH. For example, an ACK/NACK corresponding to a PDSCH scheduled by a DL assignment which is received after a reference slot m and a transmission resource of the ACK/NACK expected by a base station overlaps with the PUSCH in time. For another example, the SR is determined to be transmitted after the reference slot m, and the resources for transmitting the SR overlap with the PUSCH in time domain.

The first type of UCI includes UCI that has been determined to be transmitted on the PUSCH no later than a reference slot. It can be understood that when the user starts to prepare to generate the PUSCH, the UCI that needs to be transmitted on the PUSCH of the slot n has been determined. For example, the CSI to be transmitted in the uplink slot n is determined according to the configured period and time offset, and the resource for CSI transmission overlaps with the PUSCH in time domain. For another example, the HARQ-ACK of the PDSCH scheduled by the DL assignment is received before a predefined reference slot m or no later than the user receives the UL grant, and the transmission slot of the ACK/NACK expected by the base station is also a slot n, and resources used for HARQ-ACK transmission overlap with the PUSCH in time domain.

Wherein, the determination of the above reference slot includes any one of the following two ways:

The reference slot is a slot in which uplink control signaling (UL grant) for scheduling the PUSCH is received;

The reference slot is a slot before the slot of the PUSCH resource, and the difference between the reference slot and the slot of the PUSCH resource is predefined or configured by the base station.

Step 103: determining whether to transmit the UCI.

If the first type of UCI exists, the first type of UCI is carried by the PUSCH.

If the first type of UCI exists, determining whether UCI is carried by the PUSCH according to the number K of repeated transmissions of the PUSCH.

If the first type of UCI exists, determining to transmit all or part of the first type of UCI according to a preconfigured threshold information.

In this step, it is determined that whether the UCI is transmitted and a corresponding processing is performed based on a determination result.

Wherein, the corresponding processing based on the determination result includes:

transmitting the UCI based on the determination result; and not transmitting the UCI based on the determination result.

Further, when it is determined to transmit the UCI, steps 104-106 are executed; if it is determined not to transmit the UCI, step 106 is executed directly.

The way for determining whether to transmit the UCI includes any of the followings:

not transmitting the UCI; and transmitting the UCI directly;

determining whether to transmit the UCI according to preconfigured priority information or priority information configured by a base station;

determining whether to transmit the UCI according to preconfigured threshold information.

Further, the determining whether to transmit the UCI according to preconfigured priority information or priority information configured by a base station includes:

determining whether the UCI has a highest priority; if the UCI has the highest priority, the UCI is transmitted; otherwise, the UCI is not transmitted.

Wherein, the UCI includes an HARQ-ACK and/or an uplink scheduling request (SR).

The way for configuring the priority information configured by the base station includes any one of the followings:

a priority of the uplink data configured is higher than a priority of the ACK/NACK of the PDSCH when the base station configures uplink data;

a priority of the SR configured by the base station when configuring an SR resource;

a priority relationship between the SR and the PUSCH configured by the base station when configuring the PUSCH; and a priority relationship between the SR and the PUSCH determined according to an indication from an MAC layer.

In the above processing, if the UCI includes the HARQ-ACK, the preconfigured priority information is a first predefined priority;

The way for determining the first predefined priority includes any of the followings:

a priority of the uplink data carried by the PUSCH is higher than the priority of the ACK/NACK corresponding to the PDSCH;

a priority of the ACK/NACK corresponding to the PDSCH is higher than the priority of the uplink data carried by the PUSCH;

a priority of the ACK/NACK carried by short Physical Uplink Control Channel (PUCCH) is higher than the priority of the uplink data carried by the PUSCH; wherein, the short PUCCH is a PUCCH whose symbol length is less than a predefined threshold;

a priority of uplink data carried by the PUSCH based on a non-slot-based scheduling is higher than a priority of the ACK/NACK of the PDSCH based on a slot-based scheduling;

a priority of the ACK/NACK of the PDSCH based on the non-slot-based scheduling is higher than a priority of the uplink data carried by the PUSCH based on a slot-based scheduling;

a priority of the ACK/NACK of the PDSCH based on the non-slot-based scheduling is higher than the priority of the uplink data carried by the PUSCH based on the non-slot-based scheduling; and if the first type of UCI is included in the PUSCH, and the HARQ-ACK is included in the first type of UCI, the priority of the PUSCH is higher than the priority of the ACK/NACK of the PDSCH.

In the above processing, if the UCI includes an SR, the preconfigured priority information is a second predefined priority.

The way for determining the second predefined priority includes any of the followings:

a priority of the SR used for Ultra-Reliable and Low Latency Communications (URLLC) service is higher than the priority of the uplink data carried by the PUSCH;

If an SR period is less than an uplink transmission period, the priority of the SR is higher than the priority of the uplink data carried by the PUSCH;

a priority of the SR carried through the short PUCCH is higher than a priority of the uplink data; and a priority of the SR carried through the short PUCCH is higher than the priority of the uplink data based on slot-based scheduling;

wherein, the short PUCCH is a PUCCH whose symbol length is less than a threshold.

Further, the preconfigured threshold information includes any one of the followings:

a maximum coding rate for the UCI and/or the first type of UCI;

preconfigured parameters for controlling the number of physical resources occupied by the UCI and/or the first type of UCI;

a maximum coding rate for uplink data transmission;

preconfigured parameters for controlling the minimum number of resources required for uplink data transmission.

Step 104: determining a channel resource carrying the UCI.

In this step, the way for determining the channel resource carrying the UCI includes the following two methods:

(1) carrying the UCI on the PUSCH in a first slot through a first puncturing manner.

The carrying the UCI on the PUSCH in a first slot through a first puncturing manner includes any one of the followings:

if puncturing is performed on a PUSCH resource of a PUSCH corresponding to an OFDM symbol that is expected to be transmitted by the UCI, mapping the UCI onto the PUSCH resource;

if the OFDM symbol that is expected to be transmitted by the UCI is on the predefined PUSCH resource within the OFDM symbol next to the DMRS symbol closest to the OFDM symbol in the PUSCH, mapping the UCI onto the PUSCH resource by puncturing the PUSCH resource; wherein, the closest DMRS symbol is no later than a starting OFDM symbol of the UCI resource;

If the OFDM symbol that is expected to be transmitted by the UCI is no later than a last set of pilot symbols of the PUSCH, mapping the UCI onto the PUSCH resource by puncturing the PUSCH on the PUSCH resource predefined within the OFDM symbol next to the last set of the pilot symbols; and mapping the UCI onto the frequency domain resource by puncturing the PUSCH on a predefined frequency domain resource corresponding to the last symbol or at least two OFDM symbols of the PUSCH.

(2) carrying the UCI through the PUCCH.

Preferably, the way for determining to carry a PUCCH resource in the UCI through PUCCH, includes any one of the followings:

If the UCI includes an HARQ-ACK, determining the PUCCH resource according to the PUCCH resource configured by the base station or according to the PUCCH configured by the base station and PUCCH resource indication information in DL assignment;

If the UCI includes an SR, determining the PUCCH resource for transmitting the SR according to a period and time offset configured by the base station.

Step 105: transmitting the UCI according to the determined channel resource.

In this step, the transmitting the UCI according to the determined channel resource includes:

if the determined channel resource is a PUSCH resource and/or a PUCCH resource, transmitting the UCI according to the determined PUSCH resource and/or PUCCH resource.

Further, when the determined channel resource is a PUSCH resource, the method further includes:

transmitting the first type of UCI and the uplink data carried by the PUSCH according to the determined PUSCH resource.

Further, when the determined channel resource is a PUCCH resource, the method further includes:

a process for determining whether to transmit the first type of UCI on the PUCCH includes any one of the followings:

if the total number of bits of the first type of UCI and the UCI is greater than a preset total number of bits threshold or a preset maximum coding rate, transmitting the UCI while not transmitting the first type of UCI;

if the total number of bits of the first type of UCI and the UCI is greater than a preset total number of bits threshold or a preset maximum coding rate, compressing the first type of UCI according to a predefined rule, and transmitting the UCI and the compressed first type of UCI; and if the total number of bits of the first type of UCI and the UCI is greater than a preset total number of bits threshold or a preset maximum coding rate, transmitting the UCI and part of the first type of UCI according to the predefined rule.

Step 106: transmitting the first type of UCI and the uplink data carried by the PUSCH according to the determined PUSCH resource.

For the processing of transmitting the UCI based on the determination result and not transmitting the UCI based on the determination result in the above steps 105 to 106, may correspond to the following description:

(1) if it is determined that the UCI is not to be transmitted in the above step 103, the user transmits the PUSCH only on the uplink resource determined in step 101.

(2) if it is determined that the UCI is to be transmitted in the above step 103 and the UCI is carried by the PUCCH, the user transmits the PUCCH, and the PUSCH is not transmitted on the uplink resource determined in step 101. Or, at least the PUSCH is not transmitted on symbols that overlap with the PUCCH in time domain.

(3) if it is determined that the UCI is to be transmitted in the above step 103, and the UCI is carried through the PUSCH, the PUSCH and the UCI are transmitted.

All the appeared second UCI are defined as the UCI that is determined to be transmitted on the PUSCH after the PUSCH is generated in the foregoing steps 101 to 106; the first UCI is the UCI information that has been determined to be transmitted on the PUSCH in the foregoing steps 101 to 106; wherein, the UCI information includes first UCI and second UCI.

Figure 2:
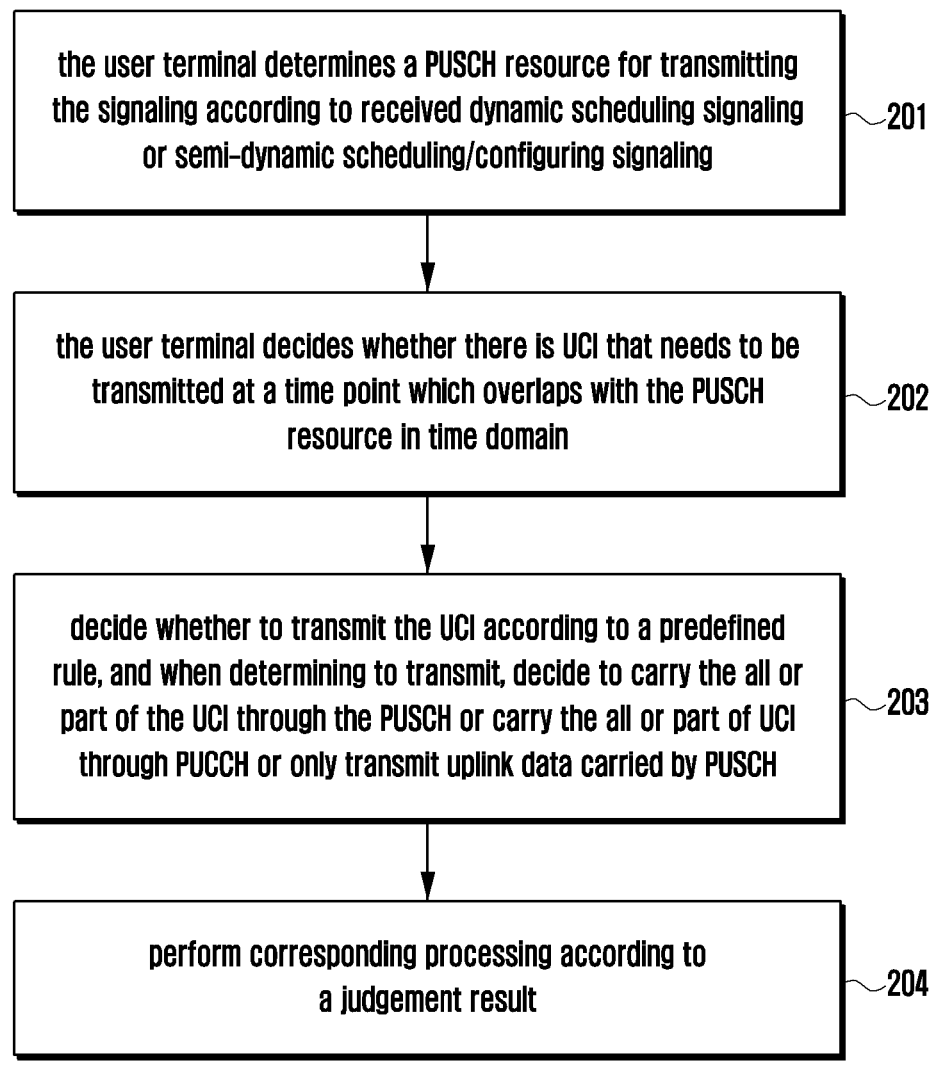
FIG. 2 is a flowchart of a method for transmitting uplink data and/or UCI by a user terminal according to the present disclosure.

Based on the above method for processing UCI provided according to the present disclosure, the present disclosure provides a method for transmitting uplink data and/or UCI by a user terminal. As shown in FIG. 2, the method includes the following steps:

Step 201: the user terminal determines a PUSCH resource available for transmitting the signaling according to received dynamic scheduling signaling or semi-static scheduling/configuration signaling.

Preferably, if the PUSCH is a GF uplink transmission and there is no uplink data to be transmitted in a corresponding PUSCH resource, the PUSCH may not be transmitted.

Step 202: the user terminal decides whether there is UCI that needs to be transmitted at a time point in time domain and overlaps with the PUSCH resource.

The deciding whether there is UCI that needs to be transmitted at a time point in time domain and overlaps with the PUSCH resource may be determined through the HARQ-ACK time or determined by a period or time offset of periodic UCI (e.g., periodic CSI or semi-static CSI or SR).

The present disclosure does not limit the order of steps 201 and 202 in time.

Step 203: deciding whether to transmit the UCI according to a predefined rule, and when determining to transmit, deciding to carry the all or part of the UCI through the PUSCH or carry the all or part of UCI through PUCCH or only transmit uplink data carried PUSCH or other states.

The predefined rule may be determined according to the rules/priorities described in Embodiment 1 or Embodiment 2 described below.

When all the UCI belongs to only one type of UCI, it is decided that whether to carry all the UCI through the PUSCH and/or the PUCCH according to the predefined rule. Wherein, all the UCI may also be transmitted in a compressed manner, for example, by bundling ACK/NACKS of a plurality of PDSCHs.

When all the UCI belongs to a plurality of types of UCI, it is decided that whether to carry all or part of the UCI through the PUSCH and/or the PUCCH according to the predefined rule. Wherein, all the UCI may also be transmitted in a compressed manner, for example, by bundling ACK/NACKS of a plurality of PDSCHs. The part of the UCI may be achieved by reserving UCI with a high priority and abandoning transmitting UCI with a low priority, and/or the part of the UCI which may be transmitted is determined by processing the delay.

In step 204, performing corresponding processing according to the judgement result.

If the judgment result of step 203 is that the UCI is carried on the PUSCH, uplink data and the UCI are transmitted on the PUSCH resource; if the judgment result of step 203 is that the UCI is carried through the PUCCH, the PUCCH is transmitted on the expected PUCCH resource, transmission of the entire PUSCH is abandoned, or the part of PUSCHs on a symbol that does not overlap with the PUCCH resource are transmitted.

Whether the user terminal transmits the PUCCH and the PUSCH at the same time or only transmits the PUCCH depends on the user capability. For example, if the user terminal has the capability to transmit the PUCCH and the PUSCH at the same time, and the base station is configured to transmit the PUCCH and the PUSCH at the same time, the user terminal transmits the PUSCH and transmits the second UCI on the PUCCH; otherwise, it can only be processed according to the processing method in step 204.

For ease of description, except for special explanation, SPS, Type 1 GF uplink transmission and Type 2 GF uplink transmission are collectively referred to as GF uplink transmission.

The PUCCH may be a PUCCH with a long symbol length (referred to as a long PUCCH for short), for example, PUCCH format 1, 3 or 4 whose symbol lengths are greater or equal to 4, or a PUCCH with a short symbol length (referred to as a short PUCCH for short), for example, PUCCH format 0, 2 whose symbol lengths are equal to 1 or 2.

The present disclosure will be specifically described below in three embodiments.

Embodiment 1

If the slot n is an uplink slot for uplink transmission that is configured by the base station, and the user terminal has uplink data that needs to be transmitted in the slot n, then the user terminal needs to decide whether there is UCI that may need to be transmitted in the slot n. If there is the UCI, the user terminal decides to transmit the PUSCH carrying the uplink data in the slot n according to a predefined rule and transmits all or part of the UCI at the same time on the PUSCH; or only the PUSCH carrying the uplink data is transmitted in slot n, and the PUSCH does not carry the UCI; or only the PUCCH carrying the UCI is transmitted in slot n, and the PUSCH for carrying at least uplink data is not transmitted.

The PUSCH may be a GF PUSCH, or may be a PUSCH scheduled based on a dynamic UL grant.

The transmitting the PUSCH in the slot n may include at least one of the following two situations: in the slot n, the PUSCH is transmitted according to a configured GF resource. For example, according to configuration information, the transmitted PUSCH is a second symbol to a last symbol in slot n; or in slot n, the PUSCH is transmitted on part of configured symbols of GF resources, for example, the second symbol to the last symbol of slot n, wherein part of symbols is used for transmitting the PUCCH. Therefore, the PUSCH is not transmitted and the PUSCH is transmitted on other symbols.

All UCI transmitted on the PUSCH includes all the UCI whose expected transmission time is slot n. The expected transmission time is determined by HARQ-ACK timing, or is determined by a period and time offset of periodic UCI (e.g., periodic CSI or semi-static CSI or SR).

Transmitting part of the UCI on the PUSCH means selecting part of the UCI to transmit, and abandoning transmitting the remaining UCI according to the predefined rule.

Transmitting the UCI on the PUSCH may be implemented by performing rate matching on uplink data of the PUSCH, and/or may be implemented by puncturing.

Preferably, if the SR is transmitted on the PUSCH, the SR can be implemented by puncturing. When there is a plurality of SR configurations in a same slot, for example, in the same slot, there are N SR resources that belong to different SR configurations (e.g., the SR resources may be configured for different logical channels). When there is an SR transmission requirement, one or more SRs with transmission requirements may be transmitted on the PUSCH in this slot. A simpler way is to select only one SR to transmit.

Preferably, when the SR is transmitted on the PUSCH in a puncturing manner, the time-frequency resources occupied for transmitting the SR try to avoid the ACK/NACK resources transmitted on the PUSCH as much as possible. For example, if the resource possibly occupied by the ACK/NACK is one side of the frequency domain resource of the PUSCH, the frequency domain resource occupied by the SR is the other side of the frequency domain resource of the PUSCH. For another example, if resources possibly occupied by the ACK/NACK are part of OFDM symbols of the PUSCH, the time domain resources occupied by the SR should avoid these OFDM symbols, for example, the SR is mapped into the OFDM symbols next to the OFDM symbols occupied by the ACK/NACK.

Preferably, the method for transmitting an SR may be suitable for transmitting an SR on a PUSCH of the GF and may also be suitable for transmitting the SR on the PUSCH based on scheduling.

Preferably, if an ACK/NACK is transmitted on the PUSCH, the puncturing or the rate matching may be determined according to the total number of bits of the ACK/NACK. For example, if the ACK/NACK is less than or equal to 2 bits, the puncturing is determined, otherwise, the rate matching is determined.

Preferably, if an ACK/NACK is transmitted on the PUSCH, whether to perform puncturing or rate matching may also be determined according to the receiving time of the PDSCH corresponding to the ACK/NACK. For example, if the PUSCH needs to be transmitted in slot n, the ACK/NACK of the PDSCH received after slot m may be transmitted in the puncturing manner.

When the user terminal decides whether to transmit the UCI according to the predefined rule, the predefined rule includes at least one of the followings:

not transmitting the UCI;

transmitting the UCI;

preconfigured priority information or priority information configured by the base station.

Wherein, the determining whether to transmit the UCI according to the preconfigured priority information or priority information configured by the base station includes:

determining whether the UCI has a highest priority; if it has the highest priority, transmitting the UCI; otherwise, not transmitting the UCI.

The UCI includes an HARQ-ACK and/or an SR and/or CSI;

When the UCI includes the HARQ-ACK, the preconfigured priority information is the first predefined priority.

A specific processing is that ACK/NACK corresponding to the PDSCH scheduled by DL assignment is received after slot m which is used as a reference slot, if the transmission slot of the ACK/NACK expected by the base station is slot n, then it is determined whether to transmit an ACK/NACK with a higher priority according to the predefined priority. The ACK/NACK corresponds to the foregoing second UCI.

Wherein, the preconfigured priority is determined by at least one of the following ways:

(a) The priority of the ACK/NACK of any PDSCH is lower than the priority of the uplink data carried by the GF uplink transmission.

Then, according to the method described above, in the uplink slot n, the transmission of the ACK/NACK of the PDSCH after slot m is abandoned, only the PUSCH of the GF carrying the uplink data is transmitted, and the PUSCH may include the ACK/NACK of the PDSCH before slot m.

(b) The priority of the ACK/NACK of any PDSCH is higher than the priority of the uplink data.

Then, in the uplink slot n, at least the ACK/NACK of the PDSCH after slot m is transmitted through the PUCCH, but the PUSCH is not transmitted in slot n, or a symbol which overlaps with the PUCCH in time domain does not transmit the PUSCH in slot n and other symbols in slot n may transmit the PUSCH.

Preferably, the PUCCH may be a long PUCCH or a short PUCCH.

(c) The priority of the ACK/NACK indicated to be carried by the short PUCCH is higher than the priority of the uplink data.

Preferably, the base station notifies the user terminal whether the ACK/NACK is transmitted through the short PUCCH or the long PUCCH, through semi-static configuration signaling and/or dynamic indication signaling.

If the base station indicates that the ACK/NACK is transmitted through the short PUCCH and the symbol for transmitting the short PUCCH overlaps with the PUSCH in time domain, then the UE transmits the short PUCCH and does not transmit the PUSCH in slot n, or a symbol that overlaps with the PUCCH in slot n does not transmit the PUSCH, and other symbols in slot n may transmit the PUSCH.

(d) A priority of the ACK/NACK of the PDSCH based on a slot-based scheduling is lower than a priority of uplink data carried on a GF uplink transmission based on a non-slot-based scheduling (for example, in a mini-slot).

(e) A priority of the ACK/NACK of a PDSCH based on a non-slot-based scheduling is higher than the priority of uplink data carried on a GF uplink transmission based on a slot-based scheduling.

(f) A priority of the ACK/NACK of a PDSCH based on a non-slot-based scheduling is higher than the priority of uplink data based on a non-slot-based scheduling.

Wherein, the priority configured by the base station is determined in the following ways:

(g) The base station configures that the priority of certain types of uplink data is higher than that of the ACK/NACK of the PDSCH. For example, the base station configures that the priority of the uplink data used for carrying URLLC service is higher than that of the ACK/NACK of eMBB downlink data. In an implementation, the user terminal determines the service type carried by the PUSCH according to information indicating the service type. The information indicating the service type may be information acquired from its higher layer by the user terminal, or information acquired from information configured by the base station. In another implementation, whether the priority of the uplink data that may be carried by the PUSCH configured by the base station is higher than that of the ACK/NACK, for example, when the PUSCH resources of the GF are configured, it is configured that the priority of the uplink data transmitted in this set of PUSCH resources is higher than that of the ACK/NACK. For another example, the priority of the uplink data carried by the PUSCH of the GF based on a non-slot-based scheduling is higher than that of the ACK/NACK of the PDSCH based on a slot-based scheduling, but lower than the priority of the ACK/NACK of the PDSCH based on a non-slot-based scheduling.

Then, when the priority of the ACK/NACK of the PDSCH is lower than or equal to the priority of the uplink data of the PUSCH, uplink transmission is implemented according to the method described above, and when the priority of the ACK/NACK of the PDSCH is higher than the priority of the uplink data of the PUSCH, the uplink transmission is implemented according to the (b).

Preferably, when the base station configures the priority, a priority may be configured for each GF uplink transmission. For example, on a same uplink carrier, when the base station configures GF uplink transmission of Type 1 and GF uplink transmission of Type 2 for the user terminal, the base station may configure a priority relationship between the uplink data of the GF uplink transmission of Type 1 and the ACK/NACK and a priority relation between the uplink data of the GF uplink transmission of Type 2 and the ACK/NACK. For example, the base station configures that the priority of the uplink data of GF uplink transmission of Type 1 is higher than the priority of the ACK/NACK and configures that the priority of the uplink data of GF uplink transmission of Type 2 is lower than the priority of the ACK/NACK. Or, for a same type of GF uplink transmission, if there are a plurality of sets of transmission configurations, the priority is determined for each set of transmission configuration.

Preferably, regardless of whether the PUSCH includes the first type of HARQ-ACK UCI, the user terminal determines whether to transmit the second type of HARQ-ACK according to any one of the methods (a) to (h).

Preferably, if the PUSCH does not include the first type of HARQ-ACK UCI, the user terminal determines whether to transmit the second type of HARQ-ACK according to any one of the methods (a) to (g). Preferably, if the PUSCH includes the first type of HARQ-ACK UCI, the user terminal does not transmit the ACK/NACK corresponding to the PDSCH scheduled by the DL assignment received after slot m through the short PUCCH (the second type of UCI) and transmits the PUSCH normally, where the PUSCH includes the first type of UCI.

Preferably, if the PUSCH is a PUSCH dynamically scheduled based on a UL grant, slot m is a slot in which the UL grant of the PUSCH is received.

Preferably, if the PUSCH is a PUSCH of a GF, the slot m is no later than slot n, and a time difference with slot n is predefined by a standard or configured by the base station. The time difference may be in a slot, or in a slot determined according to a predefined subcarrier spacing, in an OFDM symbols or in time.

Preferably, if the time difference is configured by the base station, the base station may configure the time difference by referring to a reporting capability of the user terminal, or configure the time difference by referring to a period of a GF uplink transmission. For example, the base station may configure different time differences for different GF uplink transmissions to meet the delay requirements of different service types.

Preferably, when the user terminal determines that the PUCCH needs to be transmitted, the PUCCH may only include the ACK/NACK of the PDSCH after the slot m, or the PUCCH may include the ACK/NACK of the PDSCH and all or part of the first UCI after the slot m. The advantage of including the first UCI is that when the user terminal abandons transmitting the PUSCH, these UCI that should originally be carried through the PUSCH will not be lost. If the total number of bits of the ACK/NACK of the PDSCH and the first UCI after the slot m exceeds a predefined threshold, or the coding rate of the total number of bits on the indicated PUCCH resource exceeds the configured maximum coding rate, the user terminal may determine the transmission of the UCI according to one of the following ways:

(1) Only the ACK/NACK of the PDSCH after the slot m is transmitted, and the first UCI is not transmitted.

(2) If the first UCI includes both CSI and HARQ-ACK information, the ACK/NACK of the PDSCH after the slot m and the HARQ-ACK information in the first UCI Information is transmitted, but CSI in the first UCI is not transmitted. If the total number of bits for transmitting the above two types of ACK/NACK information still exceeds a predefined threshold, or the coding rate of the total number of bits on the indicated PUCCH resource exceeds the configured maximum coding rate, then the ACK/NACK of the PDSCH after the slot m is transmitted, and the HARQ-ACK information in the first UCI is compressed. If the total number of bits of the two types of ACK/NACK information still exceed the threshold or the maximum coding rate after compression, only the ACK/NACK of the PDSCH after the slot m is transmitted.

(3) If the first UCI includes both CSI and HARQ-ACK information, the ACK/NACK of the PDSCH after the slot m is transmitted, and the compressed HARQ-ACK information in the first UCI and CSI in the first UCI are transmitted. If the total number of bits for transmitting the above UCI still exceeds a predefined threshold, or the coding rate of the total number of bits on the indicated PUCCH resource exceeds the configured maximum coding rate, then, the ACK/NACK of the PDSCH after the slot m is transmitted, the compressed HARQ-ACK information in the first UCI is transmitted, but the CSI is not transmitted. If the total number of bits of the two types of ACK/NACK information after compression still exceeds the threshold or the maximum coding rate, only the ACK/NACK of the PDSCH after the slot m is transmitted.

(4) If the first UCI only includes the CSI, and the total number of bits of the CSI and the ACK/NACK of the PDSCH after the slot m does not exceed the threshold or the maximum coding rate, the two types of UCI may be transmitted; otherwise, only the ACK/NACK of the PDSCH after the slot m is transmitted.

(5) If the first UCI only includes HARQ-ACK information, and the total number of bits of the ACK/NACK of the PDSCH after the slot m does not exceed the threshold or the maximum coding rate, then both types of the UCI may be transmitted, otherwise only the ACK/NACK of the PDSCH after the slot m is transmitted.

(6) If the first UCI only includes HARQ-ACK information, and the total number of bits of the HARQ-ACK information and the ACK/NACK of the PDSCH after the slot m does not exceed the threshold or the maximum coding rate, the compressed HARQ-ACK information in the first UCI and the ACK/NACK of the PDSCH after the slot m are transmitted. If the total number of bits of the two types of ACK/NACK information after compression still exceed the threshold or the maximum coding rate, only the ACK/NACK of the PDSCH after the slot m is transmitted.

For the compression of the ACK/NACK information of the first UCI in (2) to (6), the compression method may be HARQ-ACK bundling in spatial domain, that is, performing an AND operation on HARQ-ACKs of a plurality of transmission blocks (TB) for one PDSCH and generates one HARQ-ACK bit, and/or, the compression method may be HARQ-ACK bundling in time domain, that is, performing an AND operation on HARQ-ACKs of PDSCH of a plurality of slots of one downlink carrier and generate one HARQ-ACK bit, and/or, the compression method may be HARQ-ACK bundling for a plurality of coding block groups (CBGs) for one TB within one PDSCH, i.e. performing an AND operation on the HARQ-ACK of a plurality of CBGs for one TB within one PDSCH and generate one HARQ-ACK bit.

Preferably, when the user terminal determines not to transmit the ACK/NACK of the PDSCH after the slot m, the PUSCH transmitted in slot n may include the first UCI.

Preferably, when the user terminal determines to transmit the ACK/NACK of the PDSCH after the slot m through the PUCCH, the PUSCH transmitted in part of symbols in slot n may include the first UCI.

When the UCI includes the SR, the preconfigured priority information is the second predefined priority.

When the UCI includes SR, the user terminal decides whether to transmit the UCI according to the predefined rule. If the predefined rule is that the UCI is not transmitted, then when the UCI includes the SR, regardless of the configuration of the SR expected to be transmitted in slot n, the SR is not carried on the PUSCH, that is, the UE does not transmit the SR. The UE may transmit the SR on a next nearest available SR resource through the PUCCH, or, if the UE have sufficient time to generate a buffer status report (BSR) transmitted by the PUSCH, then the UE may transmit this BSR on the PUSCH, or transmit this BSR on a next available PUSCH. The next available PUSCH is a PUSCH where the UE has sufficient processing time to generate the BSR and the PUSCH transmitted through the PUSCH.

When the UCI includes the SR, that is, when there is a need to transmit an SR before the PUSCH transmission ends, and the resource expected to transmit the SR overlaps with the PUSCH in time, the user terminal decides whether to transmit the UCI according to the predefined rule. If the predefined rule is the priority information which is preconfigured or configured by the base station, the preconfigured priority is the predefined second predefined priority. The determining whether to transmit the SR and transmit which SRs (if there are a plurality of SR expected to be transmitted in slot n) according to the second predefined priority are determined in at least one of the following ways:

(a) The priority of the SR for the URLLC service is higher than the priority of the uplink data carried by the PUSCH. The user terminal transmits the SR with high priority by puncturing the uplink data in the PUSCH;

or, the user terminal transmits the SR with high priority through the PUCCH and does not transmit the PUSCH in a part that overlaps with the PUCCH in time or in the entire slot n. Preferably, if the UCI that needs to be transmitted in slot n also includes the ACK/NACK, the SR with high priority and the ACK/NACK are transmitted on the PUCCH.

The PUSCH may be a PUSCH of a GF, and may also be a scheduling-based PUSCH.

(b) If the period of the SR is less than the period of the GF uplink transmission, the priority of the SR is higher than the priority of the uplink data carried by the PUSCH of the GF.

Preferably, if the period of the SR is less than one slot, the priority of the SR is higher than the priority of the uplink data carried by the scheduling-based PUSCH.

The user terminal transmits an SR by puncturing the uplink data in the PUSCH;

or, the user terminal transmits the SR through the PUCCH and does not transmit the PUSCH in a part that overlaps with the PUCCH in time or in the entire slot n. Preferably, if the UCI to be transmitted in slot n also includes the ACK/NACK, the SR with high priority and the ACK/NACK are transmitted on the PUCCH.

(c) The priority of the SR indicated to be carried through the short PUCCH is higher than the priority of the uplink data.

Preferably, the base station notifies the user terminal whether the SR is transmitted through a short PUCCH or a long PUCCH, via a semi-static configuration signaling. If the base station configures that the SR is transmitted through the short PUCCH and the symbol for transmitting the short PUCCH overlaps with the PUSCH in time domain, the UE transmits the short PUCCH without transmitting the PUSCH in slot n, or the PUSCH is not transmitted in the symbols that overlaps with the PUCCH in a time dimension of the slot n, and the PUSCH is transmitted in other symbols of slot n.

Preferably, the uplink data is carried through a scheduling-based PUSCH.

(d) The priority of the SR indicated to be carried through the short PUCCH is higher than the priority of the uplink data scheduled based on the slot.

If the base station configures that the SR is transmitted through a short PUCCH, and the uplink data is carried through a PUSCH scheduled based on a slot, and a symbol for transmitting the short PUCCH overlaps with the PUSCH in a time dimension, the UE transmits the short PUCCH without transmitting the PUSCH in slot n, or the PUSCH is not transmitted in the symbols that overlaps with the PUCCH in a time dimension of the slot n, and the PUSCH is transmitted in other symbols of slot n.

If the base station configures that the SR is transmitted through a short PUCCH, and the uplink data is carried through scheduled based on a non-slot, and the UE transmits the PUSCH without transmitting the SR in slot n.

If the predefined rule is priority information configured in advance or configured by the base station, the priority configured by the base station is determined according to at least one of the following rules:

(e) The priority of the SR may be configurable. When the base station configures an SR resource, the priority of the SR is configured. For example, when the base station configures a plurality of sets of SRs, one or more sets of SRs may be configured to have higher priorities than the PUSCH, while other several sets of SRs have lower priorities than the PUSCH.

(f) The priority of the SR may be configurable. When configuring or scheduling the PUSCH, the base station may indicate a priority relationship between the SR and the PUSCH.

(g) The physical layer determines a priority relationship between the SR and the PUSCH according to the indication of the MAC layer. If the priority of the SR is higher, the UE transmits the SR through the PUCCH without transmitting the PUSCH in slot n, or the PUSCH is not transmitted in the symbols that overlaps with the PUCCH in a time dimension of the slot n and the PUSCH is transmitted in other symbols of slot n.

(h) If one PUSCH within one slot may only transmit one SR, then when there is a plurality of SRs whose priorities are higher than the uplink data carried by the PUSCH to be transmitted, the SR with the highest priority is transmitted through the puncturing or through the PUCCH and the transmission of other SRs are abandoned.

Preferably, regardless of whether the PUSCH includes the first type of HARQ-ACK UCI, the user terminal determines whether to transmit the SR according to any one of the methods (a) to (h).

Preferably, if the PUSCH does not include the first type of HARQ-ACK UCI, the user terminal determines whether to transmit the SR according to any one of the methods (a) to (h). If the PUSCH includes the first type of HARQ-ACK UCI, the user terminal does not transmit the SR through the short PUCCH and normally transmits the PUSCH, wherein the PUSCH includes the first type of UCI.

Preferably, when the user terminal determines that the PUCCH needs to be transmitted, the PUCCH may only include the SR, or the PUCCH may include the ACK/NACK of the PDSCH after the slot m and all or part of the first UCI. The advantage of including the first UCI is that when the user terminal abandons transmitting the PUSCH, these UCI that should be originally carried through the PUSCH will not be lost. Preferably, if the total number of bits of the SR and the first UCI exceeds a predefined threshold, or the encoding rate of the total number of bits on the indicated PUCCH resource exceeds the configured maximum encoding rate, Then, the user terminal may determine the transmission of the UCI according to one of the following ways:

(7) transmitting only the SR and not transmitting the first UCI.

(8) If the first UCI includes both CSI and HARQ-ACK information, the SR and the HARQ-ACK information in the first UCI are transmitted, and the CSI in UCI is not transmitted. If the total number of bits for transmitting the above ACK/NACK and SR information still exceeds the predefined threshold, or the encoding rate of the total number of bits on the indicated PUCCH resource exceeds the configured maximum encoding rate, then the SR is transmitted, and the HARQ-ACK information in the first UCI is compressed. If the total number of bits of the ACK/NACK and the SR information still exceed the threshold or the maximum coding rate after compression, only the SR is transmitted.

(9) If the first UCI includes both the CSI and HARQ-ACK information, the SR is transmitted, the HARQ-ACK information in the compressed first UCI is transmitted, and CSI in the first UCI is transmitted. If the total number of bits for transmitting the above UCI still exceeds a predefined threshold, or the coding rate of the total number of bits on the indicated PUCCH resource exceeds the configured maximum coding rate, then the SR is transmitted, and the compressed HARQ-ACK information in the first UCI is transmitted without transmitting the CSI. If the total number of bits of the SR and the ACK/NACK information still exceed the threshold or the maximum coding rate after compression, only the SR is transmitted.

(10) If the first UCI only includes the CSI, and the total number of bits of the CSI and the SR does not exceed the threshold or the maximum coding rate, the two types of UCI may be transmitted; or, only the SR is transmitted.

(11) If the first UCI only includes the HARQ-ACK information, and the total number of bits of the HARQ-ACK information and the SR does not exceed the threshold or the maximum coding rate, the two types of UCI may be transmitted. Or, only the SR is transmitted.

(12) If the first UCI only includes the HARQ-ACK information, and the total number of bits of the HARQ-ACK information and the SR does not exceed the threshold or the maximum coding rate, the compressed HARQ-ACK information in the first UCI is transmitted, and the SR is also transmitted. If the total number of bits of the SR and the ACK/NACK information still exceed the threshold or the maximum coding rate after compression, only the SR is transmitted.

For the ACK/NACK information of the first UCI in (8) to (12), the compression method refers to the compression operations for the ACK/NACK in (2) to (6).

Another specific processing is that when there is a need to transmit an SR before the PUSCH transmission ends and the resource of the SR expected to be transmitted overlaps with the PUSCH in time, whether to transmit the SR and which SR is to be transmitted are determined according to a predefined second predefined priority and a predefined reference time m'.

The second predefined priority may be determined according to the above methods.

Further, the way for determining the channel resource carrying the UCI includes:

by taking slot m as a reference slot and for the ACK/NACK corresponding to the PDSCH received after slot m, the ACK/NACK is transmitted on the PUSCH of slot n in a puncturing manner, if the transmission slot of the ACK/NACK expected by the base station is slot n.

by taking slot m as a reference slot and for the ACK/NACK corresponding to the PDSCH received after slot m, whether to transmit the ACK/NACK on the PUSCH is determined according to at least one priority rules in the first predefined priority, if the transmission slot of the ACK/NACK expected by the base station is slot n. If the ACK/NACK is transmitted on the PUSCH, then the ACK/NACK is transmitted on the PUSCH of slot n in the puncturing manner.

Preferably, the puncturing may be implemented according to one of the following ways:

assuming that the symbol excepted to be transmitted by the ACK/NACK is S1, then on the PUSCH of this symbol, i.e. on predefined frequency domain resources of the PUSCH, the ACK/NACKs are mapped onto these resources by puncturing the PUSCH resource.

assuming that the symbol expected to be transmitted by the ACK/NACK is S1, for the OFDM symbol next to the DMRS symbol nearest to the symbol in the PUSCH or the closer symbol, on the frequency domain resources of the predefined PUSCH within the OFDM symbol, the ACK/NACK is mapped onto these resources by puncturing the resources of the PUSCH. Wherein, the nearest DMRS symbol is not earlier than the starting OFDM symbol of the ACK/NACK resource.

assuming that the symbol expected to be transmitted by the ACK/NACK is S1. If S1 is no later than the last set of pilot symbols of the PUSCH, then for the adjacent symbols in the last set of pilot symbols, the puncturing is performed on the PUSCH on the predefined frequency domain resource and the ACK/NACKs are mapped onto these resources. Wherein, the symbols for transmitting the ACK/NACKs are earlier than S1.

If the user terminal obtains an SR transmission request after the reference time m', the user terminal does not transmit the SR on the PUSCH, regardless of the priority. If the SR transmission request is obtained after the reference time m', the user terminal determines whether to transmit the SR on the PUSCH according to the second preset priority.

Preferably, the predefined reference time m' is at least earlier than the beginning of the last symbol of the OFDM symbols occupied by the PUSCH. For example, if the PUSCH occupies the first to thirteenth symbols in slot n, the reference time m' is at least earlier than a boundary of the beginning of the thirteenth symbol.

Preferably, if the SR is to be transmitted in the PUSCH, the SR is transmitted by puncturing the PUSCH. The puncturing may be implemented according to one of the following ways:

if only one SR may be transmitted in the PUSCH, then one SR resource is selected by the above-described priority or the priority determined in other manner, then on the predefined frequency domain resources within the starting OFDM symbol of the SR resource that overlaps with the PUSCH in time, the SR is mapped onto these resources by puncturing the resources of the PUSCH.

if only one SR may be transmitted in the PUSCH, then one SR resource is selected by the above-described priority or the priority determined in other manner, and on the predefined frequency domain resources of the PUSCH within the OFDM symbol next to the DMRS symbol nearest to the starting DMRS symbol of the SR source in the PUSCH or the closer symbol, the SR is mapped onto these resources by puncturing the resource of the PUSCH. The nearest DMRS symbol is not earlier than the starting OFDM symbol of the SR resource.

PUSCH is punctured on predefined frequency domain resources on the last symbol or a plurality of symbols of the PUSCH, and the SR is mapped to these resources.

PUSCH is punctured on predefined frequency domain resources on the adjacent symbols of the last set of pilot symbols of the PUSCH, and the SR is mapped onto these resources.

By carrying the SR on the PUSCH or transmitting the SR on the PUCCH, the base station side may obtain the demand for a service with a high delay requirement in time. The base station may allocate resources according to the SR for uplink transmission in time, for example, allocating uplink resources for the BSR or allocating uplink resources for uplink data transmission. If necessary, while the PUSCH is being transmitted by the user terminal, the base station may transmit a UL grant again and schedule a new PUSCH, for example, schedule one PUSCH having two symbol lengths, so that the user terminal may transmit the service with high latency requirements quickly. In one implementation, if the user terminal is capable to transmit a plurality of PUSCHs at the same time, the previous PUSCH and the rescheduled PUSCH may continue to be transmitted. In another implementation, if the user terminal may only transmit one PUSCH at one time, the user terminal may stop transmitting the previous PUSCH and transmit the PUSCH that is rescheduled later.

Preferably, if the time resource expected to be transmitted by the UCI does not overlap with the resources of the PUSCH, the PUCCH and the PUSCH may be separately transmitted in a time division multiplexing (TDM) manner. For example, the last symbol in slot n with a length of 14 symbols is the PUCCH resource of the SR, and the PUSCH in slot n only occupies the first 13 symbols, then PUSCH may be transmitted in the first 13 symbols, and PUCCH format 0 is transmitted in the last symbol.

Further, the transmitting the UCI according to the determined channel resource specifically includes the following processing:

taking slot m as a reference slot, for the ACK/NACK corresponding to the PDSCH scheduled by a DL assignment received after slot m, regardless of whether the transmission slot of the ACK/NACK expected by the base station is slot n, the ACK/NACK is not transmitted on the PUSCH of slot n. In other words, the user terminal does not include the ACK/NACK corresponding to the PDSCH scheduled by the DL assignment received after slot m in the PUSCH transmitted in slot n, and the user terminal also does not transmit the ACK/NACK through the PUCCH in slot n.

Preferably, the user terminal transmits the PUSCH carrying the uplink data and the first UCI only in slot n, or transmits the PUSCH including only the uplink control signaling of the first UCI.

Wherein, the first UCI includes the PDSCH scheduled by the DL assignment received in and before slot m and the ACK/NACK of the PDSCH whose transmission slot of the ACK/NACK corresponding to the PDSCH is n, or CSI, or its belonging ACK/NACK and the CSI.

Correspondingly, if the user transmits the second type of UCI and transmits the second type of UCI on the PUSCH, the base station receives the PUSCH on the PUSCH resource, or receives the second type of UCI and/or the first type of UCI and/or the uplink data.

Correspondingly, if the user transmits the second type of UCI and transmits the second type of UCI on the PUCCH, the base station receives the second type of UCI or receives the first and second types of UCI on the PUCCH resource.

Preferably, the base station may further determine whether the PUSCH is received according to whether the PUCCH is received. Or, the base station may detect the PUSCH and the PUCCH respectively.

Embodiment 2

If the slot n is an uplink slot configured by the base station and available for GF uplink transmission, and the user terminal has uplink data that needs to be transmitted in slot n, then the user terminal needs to decide whether there is UCI that may need to be transmitted in slot n. If there is the UCI, the user terminal decides it is the uplink data carried by the PUSCH for transmitting the GF in slot n and transmits all or part of UCI on the PUSCH at the same time, or only transmits the uplink data carried by the PUSCH in slot n without transmitting the UCI; or only transmits the UCI carried by the PUCCH in slot n without transmitting the PUSCH carrying at least the uplink data.

The predefined rule is to determine whether all or part of UCI may be transmitted on the PUSCH according to the predefined threshold and/or the priority.

Wherein, the predefined priority includes at least one of the following:

(2.1) The predefined priority is predefined by the standard:

(a) The predefined priority is the priority provided in Embodiment 1.

(b) The predefined priority is: ACK/NACK>first type of CSI>second type of CSI>uplink data of GF. Preferably, contents of the first type of CSI and the second type of CSI are different, for example, the first type of CSI includes an RI (rank indicator) or a beam indicator, and the second type of CSI includes a PMI or a CQI.

(c) The predefined priority is: ACK/NACK=SR>first type of CSI>second type of CSI>uplink data of GF.

(d) The predefined priority is: ACK/NACK=SR>uplink data of GF for URLLC>first type of CSI>second type of CSI>uplink data of GF.

(2.2) The predefined priority is configured by the base station, and the base station may configure the corresponding priority for each GF uplink transmission.

The predefined threshold is used for determining the minimum value of the uplink resources required for the uplink data and/or UCI with high priority. The predefined threshold includes at least one of the followings:

(2.3) The predefined threshold is the maximum coding rate applicable to the UCI.

Preferably, a resource element (RE) required for the UCI is calculated according to the maximum coding rate. If the number of PUSCH resources of the GF<the number of REs whose priority is higher than the uplink data and is required for the UCI, then the UCI is transmitted on the PUCCH and the transmission of the uplink data is abandoned. Wherein, the number of resources of the PUSCH of the GF is determined by the semi-static configuration signaling or activation/deactivation of dynamic signaling. If the number of the PUSCH resources of the GF≥the number of REs whose priority is higher than the uplink data and is required for the UCI, then at least the UCI and uplink data with high priority are transmitted on the PUSCH resources. At this time, it may occur that the number of resources available for uplink data transmission is too small, resulting in degraded performance of the uplink data.

Preferably, all the UCI may be transmitted on the PUCCH, or part of the UCI with higher priority that may be transmitted on the PUCCH may be determined according to the relationship between the number of PUCCH resources and the predefined threshold.

Preferably, the $\beta_{offset}$ may have different values for different types of UCI, and may also have different values for the same type of UCI but different total number of bits.

(2.4) The predefined threshold is a parameter $\beta_{offset}$ configured by the base station for controlling the number of physical resources occupied by the UCI.

Preferably, the number of REs required for the UCI is calculated according to $\beta_{offset}$. An example of $\beta_{offset}$ is in the following formula. Wherein, $\beta_{offset}$ is the number of modulation symbols for HARQ-ACK which is equivalent to the number of occupied resources, $\beta_{offset}$ may be the number of HARQ-ACK bits, $\beta_{offset}$ may be the bandwidth of the PUSCH, $\beta_{offset}$ may be the number of symbols available for PUSCH transmission, and C may be the number of coding blocks, $\beta_{offset}$ may be number of bits of each coding block. The number of bits. Of course, the present disclosed is not limited to the formula.

If the number of PUSCH resources of the GF<the number of resources whose priority is higher than the uplink data and corresponds to the UCI, then the UCI is transmitted on the PUCCH and the uplink data is abandoned transmitting. If the number of resources of the PUSCH of the GF≥the number of resources whose priority is higher than the uplink data, then the UCI and the uplink data with high priority is transmitted on the PUSCH resources.

Preferably, $\beta_{offset}$ may have different values for different types of UCI, and may also have different values for the same type of UCI but different total number of bits. For different types of uplink transmissions, such as scheduling-based uplink transmission and GF uplink transmission, and different types (Type1, Type2) of GF uplink transmission, even different resources of the same type of GF uplink transmission may be configured with different values.

(2.5) The predefined threshold is the maximum coding rate applicable to uplink data transmission.

Preferably, the number of REs required for uplink data is calculated according to the maximum coding rate. If the number of the PUSCH resources of the GF<the minimum number of REs required for the uplink data determined according to the predefined threshold+the number of REs required for the UCI whose priority is higher than the uplink data, then the UCI is transmitted on the PUCCH and the transmission of the PUSCH is abandoned; or, If the number of PUSCH resources of the GF≥the minimum number of REs required for the uplink data determined according to the predefined threshold+the number of REs required for the UCI whose priority is higher than the uplink data, but the number of REs of the PUSCH of the GF<the minimum number of REs required for the uplink data determined according to the predefined threshold+the number of REs required for the UCI whose priority is lower than the uplink data, then only the PUSCH is transmitted, wherein the PUSCH includes at least the uplink data and the UCI whose priority is higher than the uplink data.

(2.6) The predefined threshold is a parameter $\alpha_{offset}$ configured by the base station for controlling the minimum number of REs required for uplink data transmission.

Preferably, the number of REs required for the uplink data is calculated according to $\alpha_{offset}$. If the number of REs of the PUSCH of the GF<the number of REs required for the uplink data determined according to the predefine threshold+the number of REs required for the UCI whose priority is higher than the uplink data, then the UCI is transmitted on the PUCCH and the transmission of the PUSCH is abandoned; or If the number of PUSCH resources of the GF≥the minimum number of REs required for the uplink data determined according to the predefined threshold+the number of REs required for the UCI whose priority is higher than the uplink data, but the number of PUSCH resources of the GF<the minimum number of REs required for the uplink data determined according to the predefined threshold+the number of REs required for the UCI whose priority is higher than the uplink data+the number of REs required for the UCI whose priority is lower than the uplink data, only the PUSCH is transmitted, wherein the PUSCH includes at least the uplink data and the UCI whose priority is higher than the uplink data.

Preferably, the $\alpha_{offset}$ may employ different values for different uplink transmission types, for example, different types of GF uplink transmissions (Type1, Type2) and even different resource of the same type of GF uplink transmission are configured with different values.

Preferably, the UCI in Embodiment 2 is the UCI determined not later than the reference time m or the reference time m' in Embodiment 1.

Preferably, the method for transmitting UCI in Embodiment 2 is applicable to any UCI that is expected to be transmitted on the time resource of the PUSCH.

Embodiment 3

The ACK/NACK is transmitted on the PUSCH of the GF. When the number of bits of the ACK/NACK exceeds the predefined threshold, the rate matching needs to be performed on the PUSCH. In order to ensure that the base station side and the user side have the same understanding of the rate-matching resources, it is necessary to make the user terminal and the base station side have the same understanding about the number of bits of the ACK/NACK.

Different from the scheduling-based PUSCH, the number of bits of the ACK/NACK may be explicitly indicated in the dynamic UL grant of the scheduling-based PUSCH, and the PUSCH of the GF does not have the UL grant, and therefore the number of bits of the ACK/NACK may only be determined according to the predefined rule and the scheduling signaling of the PDSCH.

In an implementation, the number of bits of ACK/NACK bits transmitted on the PUSCH of the GF is always an integral multiple of M. Correspondingly, if the base station finds that the ACK/NACK may be transmitted on the PUSCH of the GF, the total number of scheduled PDCCHs should be an integer multiple of M. Then, if the number of bits of the ACK/NACK corresponding to the PDCCH received by the UE is not an integer multiple of M, and feedback is performed according to a value N which is not less than the total number of received PDCCHs and is an integer multiple of M.

In another implementation, in the dynamic signaling for scheduling the PDSCH, the total number of bits of the ACK/NACK is indicated. For example, 2-bit DAI corresponds to 10, 20, 30, 40 bits, respectively. The number of bits of the ACK/NACK transmitted on the PUSCH of the GF is determined by the DAI, but if the base station dynamically schedules the PUSCH by using the UL grant, the user terminal may determine the number of bits of the ACK/NACK according to the value indicated in the UL grant. The value can be different from the value indicated in the downlink scheduling signaling.

Embodiment 4

When the base station transmits a UL grant to schedule the UE to transmit K PUSCHs on K time units, if at least one or more time units on the K time units may need to transmit the UCI, the predefined rules shall be used to determine whether to transmit the UCI and how to determine the total number of bits of the UCI.

The UCI at least includes the HARQ-ACK information. The UL grant at least includes information that may be used to determine the number of bits of the HARQ-ACK information.

Preferably, the time unit is an uplink slot. The UE determines the slot of the first PUSCH of the K PUSCHs according to the indication K2 for transmitting the PUSCH timing information in the UL grant, and transmits the PUSCH in K consecutive slots using the slot as a starting point. If the PUSCH may not be transmitted in one or more of the K slots, for example, the slot does not include uplink symbols sufficient to transmit the PUSCH, no PUSCH is transmitted in this slot.

The UE determines the time unit in which the HARQ-ACK is expected to be transmitted according to the HARQ-ACK timing information in the DL DCI for scheduling the PDSCH or the HARQ-ACK timing information configured by the base station. The UE determines a PUCCH resource for carrying the HARQ-ACK according to PUCCH resource indication information in a DL DCI for scheduling the PDSCH or in a predefined manner.

Preferably, the length of the PUCCH is not limited to 1, and it may be repeated for L times.

Preferably, the K PUSCHs correspond to a same TB.

Preferably, the K PUSCHs correspond to different TBs.

If the PUCCH resource expected to transmit the HARQ-ACK overlaps with the PUSCH in the time dimension, that is, there are overlapped slots and overlapped symbols in the slots, the UE may determine whether to transmit the HARQ-ACK and PUSCH, and determine the bit information length of the HARQ-ACK according to at least one of the following ways:

(1) It is assumed that the starting point symbol index of the PUCCH is S1, the starting point symbol index of the PUSCH of the slot of the PUCCH is S2, and if the time difference between the symbol corresponding to the minimum value of S1 and S2 and the last symbol of the PDSCH of the HARQ-ACK is not less than a predefined delay Th1, and a time difference between a symbol corresponding to the minimum value of S1 and S2 and the last symbol of the UL grant for scheduling the PUSCH is not less than a predefined delay Th2, then the UE transmits the HARQ-ACK information included in the PUCCH on the PUSCH, the UE does not transmit the PUCCH; or the UE considers it is a wrong scheduling or configuration.

The delay Th1 is (N1+X) symbols, wherein N1 is a minimum processing delay for HARQ-ACK processing, reference can be made to the values in the standard TS 38.214 or 213, and the delay Th2 is (N2+Y) symbols, wherein N2 is the minimum processing delay for preparing the uplink physical channel, reference can be made to the values in the standard TS 38.214.

If according to the above manner, the UE determines to transmit the HARQ-ACK information, then:

(1.1) The Uplink Downlink Assignment Index (UL DAI) for determining the number of bits of the HARQ-ACK information indicated in the UL grant for scheduling the PUSCH is only used for determining the total number of bits of the HARQ-ACK information to be transmitted in the first slot of the PUSCH, and the total number of bits of HARQ-ACK information to be transmitted in other timeslots of the PUSCH is independent of the UL DAI.

In an implementation, the number of bits of the HARQ-ACK information in the first slot of the PUSCH is determined according to the UL DAI: for a dynamic codebook, the UL DAI is used to determine the total number of bits of the HARQ-ACK information; for a semi-static codebook, the UL DAI is used to determine whether to transmit the HARQ-ACK information, if the HARQ-ACK information is transmitted, the total number of bits of the HARQ-ACK semi-static codebook is determined according to the method in the prior art. If the total number of bits of the HARQ-ACK in the first slot of the PUSCH exceeds a predefined threshold, for example, the threshold is 2 bits, the rate matching is performed on the PUSCH on a physical resource position for carrying the HARQ-ACK information, if less than or equal to the threshold, and a puncturing operation is performed on the physical resource position for carrying the HARQ-ACK information. Furthermore, if there is HARQ-ACK information to be transmitted in other slots of the PUSCH, the number of bits of the HARQ-ACK does not exceed a predetermined threshold, for example, the threshold is 2 bits. The UE transmits the HARQ-ACK information on the PUSCH in the PUSCH slot overlapping with the PUCCH. The number of bits of the HARQ-ACK information may be indicated according to the Total DAI in the DL DCI for scheduling PDSCH; a puncturing operation is performed on the PUSCH on the physical resource position for carrying the HARQ-ACK information. If the number of bits of the HARQ-ACK exceeds the predetermined threshold, it is considered as a system error.

Figure 4:
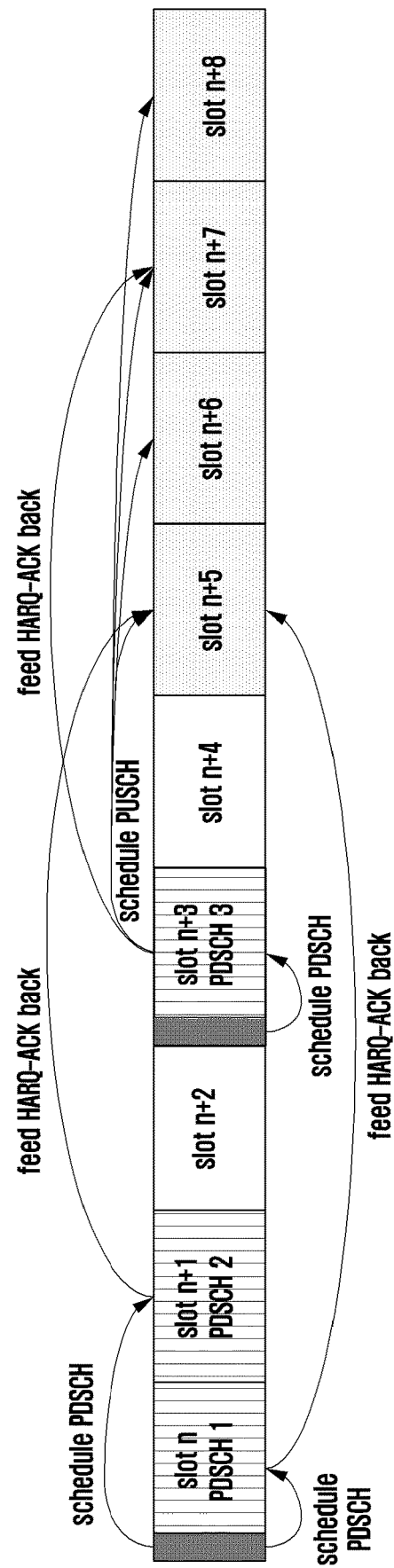
FIG. 4 is an implementation for transmitting the uplink data and the UCI by a user terminal according to the present disclosure.

As shown in FIG. 4, the UE receives DL DCI scheduling PDSCH 1 and PDSCH 2 in slot n, the HARQ-ACK is expected to be transmitted in slot n+5, and DL DCI scheduling PDSCH3 is received in slot n+3, the HARQ-ACK is expected to be transmitted in slot n+7. The UE receives the UL grant in slot n+3 and schedules a PUSCH with a length of 4 slots. Its starting point is slot n+5. It is assumed that the UL DAI in the UL grant indicates the number of bits of the HARQ-ACK is 3, then, in the first slot of the PUSCH, i.e. the slot 5, the number of bits of the HARQ-ACK carried by the PUSCH is 3. The UE determines the HARQ-ACKs of the PDSCH are the first and second bit in the 3-bit HARQ-ACK codebook according to the DL DAI in the DL DCI of scheduling PDSCH 1, 2, and the third bit in the 3-bit HARQ-ACK codebook is NACK. The UE determines that the number of bits of the HARQ-ACK in slot 7 of the PUSCH is 1 according to the DL DAI in the DL DCI of scheduling PDSCH 3.

In another implementation, the number of bits of the HARQ-ACK information in the first slot of the PUSCH is determined according to the UL DAI, and the number of bits of the HARQ-ACK information in other slots of the PUSCH is determined according to total DAI in the DL DCI of scheduling PDSCH or the size of the semi-static codebook. For the first slot and/or the other slots of the PUSCH, if the HARQ-ACK information is transmitted on the PUSCH and the total number of bits of the HARQ-ACK exceeds the predefined threshold, the rate matching is performed on the PUSCH on the physical resource position for carrying the HARQ-ACK information; if less than or equal to the threshold, the puncturing operation is performed on the PUSCH on the physical resource position for carrying the HARQ-ACK information.

Figure 5:
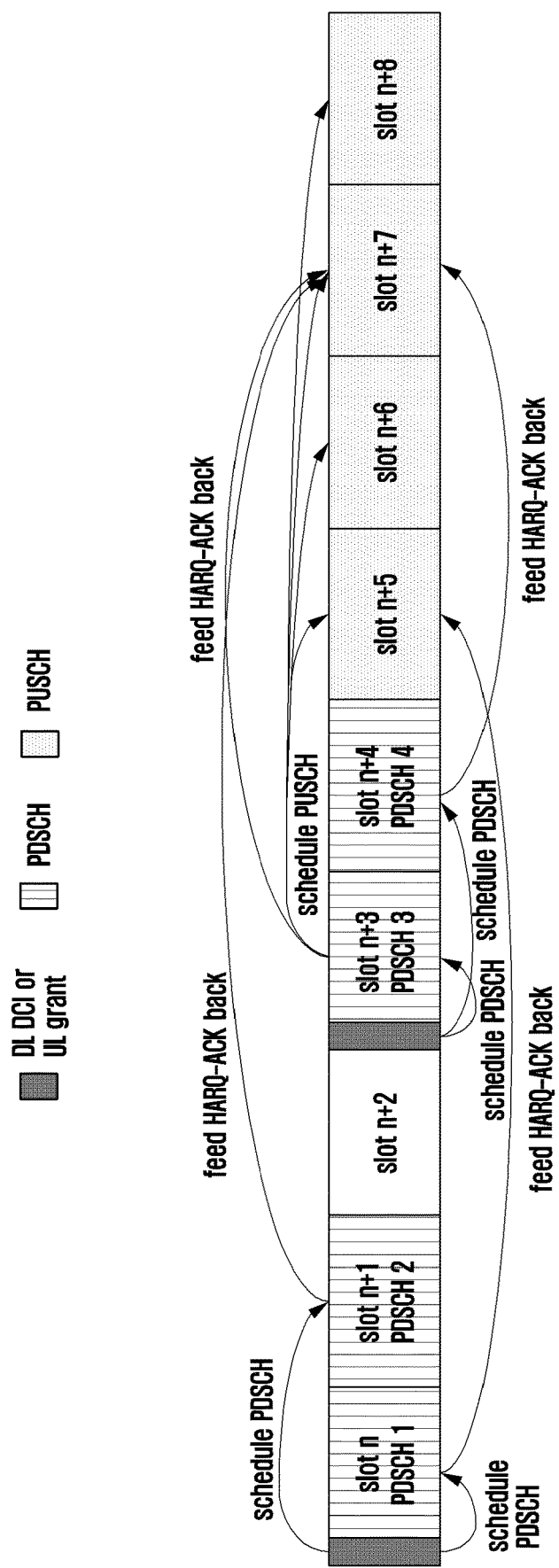
FIG. 5 is another implementation for transmitting the uplink data and the UCI by a user terminal according to the present disclosure.

As shown in FIG. 5, the UE receives DL DCI scheduling PDSCH 1 and PDSCH 2 in slot n, the HARQ-ACK is expected to be transmitted in slot n+5 and slot n+7, and receives DL DCI scheduling PDSCH 3 and PDSCH 4 in slot 3, and the HARQ-ACK is expected to be transmitted in slot n+7. The UE receives the UL grant in slot n+3 and schedules a PUSCH with a length of 4 slots. Its starting point is slot n+5. It is assumed that the UL DAI in the UL grant indicates the number of bits of the HARQ-ACK is 1, then the number of bits of the HARQ-ACK carried by the UE through the PUSCH in the first slot of the PUSCH (i.e. slot 5). is 1. The UE determines that the number of bits of the HARQ-ACK in slot 7 of the PUSCH is 3 according to the DL DAI in the DL DCL of scheduling PDSCH 2, 3 and 4. The rate matching is performed on the PUSCH by avoiding the time-frequency resources of 3-bit HARQ-ACK codebook.

(1.2) A UL DAI indicated in a UL grant for scheduling PUSCH is used to determine the total number of bits of the HARQ-ACK information to be transmitted in each slot of the PUSCH, and the total number of bits of the HARQ-ACK information of each slot are equal.

Figure 6:
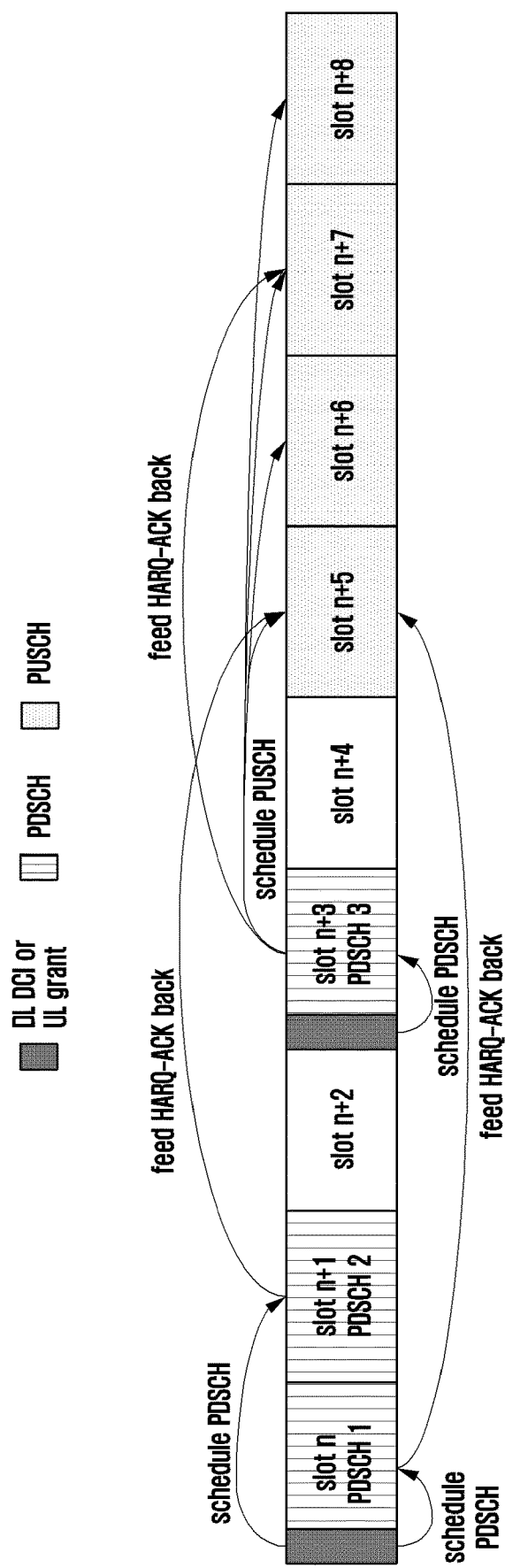
FIG. 6 is still another implementation for transmitting the uplink data and the UCI by a user terminal according to the present disclosure.

If the UE is configured with a dynamic codebook, the UL DAI is used to determine the total number of bits of the HARQ-ACK information carried in each of the PUSCH slots. If the total number of bits $X_1$ of the HARQ-ACK information determined by the PDSCH and actually received by the UE is less than the total number of bits $X_2$ of the HARQ-ACK information determined according to the UL DAI, then the UE transmits $X_2$ bits of the HARQ-ACK, wherein the last $X_2-X_1$ bit is an NACK or a predefined occupied bit. As shown in FIG. 6, the UE receives DL DCI scheduling PDSCH 1 and PDSCH 2 in slot n, the HARQ-ACK is expected to be transmitted in slot n+5, and DL DCI scheduling PDSCH 3 is received in slot n+3, the HARQ-ACK is expected to be transmitted in slot n+7. The UE receives the UL grant in slot n+3 and schedules a PUSCH with a length of 4 slots. Its starting point is slot n+5. It is assuming that the UL DAI in the UL grant indicates that the number of bits of the HARQ-ACK is 3, then in each slot of the PUSCH, i.e. the slots 5-8, the number of bits of the HARQ-ACK carried through the PUSCH is 3. For slot n+5, the UE determines that the HARQ-ACKs of the PDSCH are the first and second bits in the 3-bit HARQ-ACK codebook according to the DL DAL in the DL DCI of scheduling PDSCH 1 and PDSCH 2, and the third bit in the 3-bit HARQ-ACK codebook is the NACK. For the slot 7, the UE determines that the HARQ-ACK of the PDSCH 3 is the first bit in the 3-bit HARQ-ACK codebook according to the DL DAI in the DL DCI of scheduling PDSCH 3 and generates 2-bit NACK. For slot n+6 and slot n+8, if the UE does not receive the PDSCH where the HARQ-ACK is to be transmitted in the slot, then the UE generates 3-bit HARQ-ACK codebook for slot n+6 and slot n+8, where each bit is the NACK. For these four slots, the rate matching is performed on the PUSCH by avoiding the time-frequency resources occupied by the HARQ-ACK codebook.

(1.3) HARQ-ACK information is transmitted only in the first slot of the PUSCH.

The UE transmits the HARQ-ACK information of the slot corresponding to the first slot of the PUSCH. As shown in FIG. 6, the UE transmits 3-bit HARQ-ACK including the HARQ-ACK of PDSCH 1 and PDSCH 2 only in slot n+5, and does not transmit HARQ-ACK information in slot n+6 to slot n+8.

(1.4) The same HARQ-ACK information is transmitted in each slot of the PUSCH.

In an implementation, only the HARQ-ACK information in the first slot corresponding to the PUSCH is repeatedly transmitted in each slot of the PUSCH. The HARQ-ACK information corresponding to other slots of the PUSCH is not transmitted. Then, the UL DAI in the UL grant indicates the total number of bits of the HARQ-ACK information.

In another implementation, when scheduling, the base station should ensure that only one slot in the PUSCH overlaps with the PUCCH, and the UE repeatedly transmits the HARQ-ACK information included in the PUCCH in each slot of the PUSCH. The UL DAI in the UL grant indicates the total number of bits of the HARQ-ACK information.

(1.5) The number of bits of the HARQ-ACK does not exceed the predetermined threshold, for example, the threshold is 2 bits. The UE transmits the HARQ-ACK information on a PUSCH in the PUSCH slot that overlaps with the PUCCH, and performs a puncturing operation on the PUSCH on a physical resource location for carrying the HARQ-ACK information. If the number of bits of the HARQ-ACK exceeds the predetermined threshold, it is considered as a system error.

Preferably, the base station needs to avoid transmitting the DL DCI scheduling PDSCH after the slot of the UL grant for scheduling PUSCH and indicate that the time domain resource of the HARQ-ACK of the PDSCH overlaps with the time domain resource of the PUSCH.

Preferably, the base station may transmit the DL DCI scheduling PDSCH after the slot of the UL grant for scheduling PUSCH and indicate that the time domain resource of the HARQ-ACK of the PDSCH overlaps with the time domain resource of the PUSCH.

(2) If the slot of the PUCCH is the same as at least one slot of the PUSCH, then in the same slot, the UE transmits the PUCCH without transmitting the PUSCH, and in other slots of the PUSCH, the UE transmits the PUSCH. For example, the slots of the PUSCH are slots 1 to 4, the slot of the PUCCH is slot 2. The UE transmits the PUCCH in slot 2 and transmits the PUSCH in slots 1, 3 and 4.

(3) If the slot of the PUCCH is the same as at least one slot of the PUSCH, the UE transmits the PUCCH without transmitting the PUSCH. For example, the slots of the PUSCH are slots 1 to 4, and the slot of the PUCCH is slot 2. Then, the UE transmits the PUCCH only in slot 2 and does not transmit the PUSCH in slots 1 to 4.

(4) If the slot of the PUCCH is the same as the first slot of the PUSCH, and a starting point symbol index of the PUCCH is S1, a starting point symbol index in the first slot of the PUSCH is S2. If the time difference between the symbol corresponding to the minimum value of S1 and S2 and the last symbol of the PDSCH of the HARQ-ACK is not less than the predefined delay Th1, and the time difference between the symbol corresponding to the minimum value of S1 and S2 and the last symbol of the UL grant for scheduling PDSCH is not less than the predefined delay Th2, then the HARQ-ACK information included in the PUCCH is transmitted in the first slot of the PUSCH, the UE does not transmit the PUCCH; or the UE considers it is a wrong scheduling or configuration. In other words, the base station should not schedule that the PUCCH including the HARQ-ACK information starts from any of the second slot to the $K^{th}$ slot of the PUSCH.

Preferably, when the PUCCH repeats L transmissions, for example, repeats transmissions in L slots, if $L_0$ slots in the L slots overlap with the PUSCH, wherein $L_0<L$, then the PUSCH is not transmitted in $L_0$ slots, and only the PUCCH is transmitted.

Preferably, when the UE has the PUSCHs of a plurality of uplink carriers that overlaps with the PUCCH, the UE transmits the HARQ-ACK information of the PUCCH by preferentially selecting the uplink carrier carrying the PUSCH in which K=1. When there is a plurality of uplink carriers, one uplink carrier is selected according to a carrier index. For example, as shown in FIG. 6, if the PUSCH in which K=4 is configured for the uplink carrier 1, that is, the PUSCH shown in this figure, if the PUSCH in which K=1 is configured for the uplink carrier 2, the UE selects to carry the HARQ-ACK in slot n+5 on the PUSCH of the uplink carrier 2.

Figure 3:
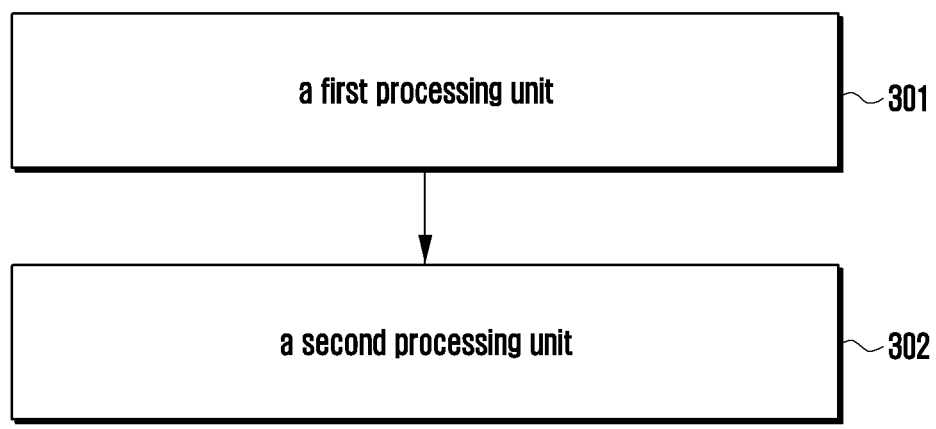
FIG. 3 is a schematic structural diagram of a terminal according to the present disclosure.

The present disclosure also provides a terminal, as shown in FIG. 3, including:

a first processing unit 31, configured to determine the UCI which overlaps with Physical Uplink Shared Channel (PUSCH) resource in time domain according to the PUSCH resource;

a second processing unit 32, configured to determine whether to transmit the UCI, and perform corresponding processing based on a determination result.

The present disclosure also provides a terminal device, comprising a memory and a first processor, the memory configured to store a computer program, the computer program implements steps of methods for processing uplink control information according to the above method for processing the UCI while executing by the first processor.

In the present disclosure, by determining the UCI which overlaps with a PUSCH resource in time domain according to the PUSCH resource, the determination of the UCI to be transmitted is achieved; then by determining whether to transmit the UCI and performing corresponding processing based on the determination result, effective transmission of the UCI to be transmitted is achieved, and transmission efficiency is improved.

It should be understood by those skilled in the art that the present invention involves apparatuses for performing one or more of operations as described in the present invention. Those apparatuses may be specially designed and manufactured as intended or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present invention may be alternated, changed, combined or deleted. Further, the operations, methods, other steps in the flows, measures and solutions already discussed in the present invention may also be alternated, changed, rearranged, decomposed, combined or deleted. Further, prior arts having the operations, methods, the steps in the flows, measures and solutions already discussed in the present invention may also be alternated, changed, rearranged, decomposed, combined or deleted.

The foregoing descriptions are merely preferred embodiments of the present invention. It should be noted that, for a person of ordinary skill in the art, various modifications and embellishments can be made without departing from the principle of the present invention. Such modifications and embellishments shall be regarded as falling into the protection scope of the present invention.

The invention claimed is:

1. A method performed by a terminal in a wireless communication system, the method comprising:
   receiving, from a base station, information on a priority for an uplink transmission;
   identifying that a physical uplink control channel (PUCCH) transmission and a physical uplink shared channel (PUSCH) transmission are overlapped in time; and
   transmitting, to the base station, an uplink signal for one of the PUCCH transmission and the PUSCH transmission based on the information on the priority,
   wherein the PUSCH transmission includes a grant free (GF) transmission without dynamic scheduling, and the PUCCH transmission includes an acknowledgement or a negative acknowledgment (ACK/NACK) transmission,
   wherein the information on the priority for the GF transmission is configured based on configuration information for the GF transmission, and
   wherein, in case that a type 1 GF transmission and a type 2 transmission are configured by the base station,
   a priority configured for the type 1 GF transmission is higher than a priority of an acknowledgement or a negative acknowledgment (ACK/NACK) transmission, and the priority of the ACK/NACK transmission is higher than a priority configured for the type 2 GF transmission.

2. The method of claim 1,
   wherein the PUCCH transmission further includes a scheduling request (SR) transmission.

3. The method of claim 1, wherein transmitting an uplink signal for one of the PUCCH transmission and the PUSCH transmission further comprises:
   performing the PUCCH transmission of a high priority, in case that the PUCCH transmission of the high priority overlaps in time with the PUSCH transmission of a low priority.

4. The method of claim 1, wherein transmitting an uplink signal for one of the PUCCH transmission and the PUSCH transmission further comprises:

performing the PUSCH transmission of a high priority, in case that the PUSCH transmission of the high priority overlaps in time with the PUCCH transmission of a low priority.

5. The method of claim 2,
wherein, in case that a plurality of SR resources are configured by the base station, the information on the priority for each SR transmission is determined based on information configuring each SR resource among the plurality of the SR resources.

6. A method performed by a base station in a wireless communication system, the method comprising:
transmitting, to a terminal, information on a priority for an uplink transmission; and
receiving, from the terminal, an uplink signal for one of a physical uplink control channel (PUCCH) transmission and a physical uplink shared channel (PUSCH) transmission based on the information on the priority, in case that the PUCCH transmission and the PUSCH transmission are overlapped in time,
wherein the PUSCH transmission includes a grant free (GF) transmission without dynamic scheduling, and the PUCCH transmission includes an acknowledgement or a negative acknowledgment (ACK/NACK) transmission,
wherein the information on the priority for the GF transmission is configured based on configuration information for the GF transmission, and
wherein, in case that the base station configures a type 1 GF transmission and a type 2 GF transmission for the terminal
a priority configured for the type 1 GF transmission is higher than a priority of an acknowledgement or a negative acknowledgment (ACK/NACK) transmission, and the priority of the ACK/NACK transmission is higher than a priority configured for the Type 2 GF transmission.

7. The method of claim 6,
wherein the PUCCH transmission further includes a scheduling request (SR) transmission.

8. The method of claim 6, wherein receiving an uplink signal for one of the PUCCH transmission and the PUSCH transmission further comprises:
receiving, from the terminal, the PUCCH transmission of a high priority, in case that the PUCCH transmission of the high priority overlaps in time with the PUSCH transmission of a low priority.

9. The method of claim 6, wherein receiving an uplink signal for one of the PUCCH transmission and the PUSCH transmission further comprises:
receiving, from the terminal, the PUSCH transmission of a high priority, in case that the PUSCH transmission of the high priority overlaps in time with the PUCCH transmission of a low priority.

10. The method of claim 7,
wherein, in case that a plurality of SR resources are configured by the base station, the information on the priority for each SR transmission is determined based on information configuring each SR resource among the plurality of the SR resources.

11. A terminal in a wireless communication system, the terminal comprising:
a transceiver; and
a controller configured to:
control the transceiver to receive, from a base station, priority information on a priority for an uplink transmission;
identify that a physical uplink control channel (PUCCH) transmission and a physical uplink shared channel (PUSCH) transmission are overlapped in time; and
control the transceiver to transmit, to the base station, an uplink signal for one of the PUCCH transmission and the PUSCH transmission based on the information on the priority,
wherein the PUSCH transmission includes a grant free (GF) transmission without dynamic scheduling, and the PUCCH transmission includes an acknowledgement or a negative acknowledgment (ACK/NACK) transmission,
wherein the information on the priority for the GF transmission is configured based on configuration information for the GF transmission, and
wherein, in case that a type 1 GF transmission and a type 2 GF transmission are configured by the base station,
a priority configured for the type 1 GF transmission is higher than a priority of an acknowledgement or a negative acknowledgment (ACK/NACK) transmission, and the priority of the ACK/NACK transmission is higher than a priority configured for the type 2 GF transmission.

12. The terminal of claim 11,
wherein the PUCCH transmission further includes a scheduling request (SR) transmission.

13. The terminal of claim 11,
wherein the controller is further configured to control the transceiver to perform the PUCCH transmission of a high priority, in case that the PUCCH transmission of the high priority overlaps in time with the PUSCH transmission of a low priority.

14. The terminal of claim 11,
wherein the controller is further configured to control the transceiver to perform the PUSCH transmission of a high priority, in case that the PUSCH transmission of the high priority overlaps in time with the PUCCH transmission of a low priority.

15. The terminal of claim 12,
wherein, in case that a plurality of SR resources are configured by the base station, the information on the priority for each SR transmission is determined based on information configuring each SR resource among the plurality of the SR resources.

16. A base station in a wireless communication system, the base station comprising:
a transceiver; and
a controller configured to:
control the transceiver to transmit, to a terminal, priority information on a priority for an uplink transmission; and
control the transceiver to receive, from the terminal, an uplink signal for one of a physical uplink control channel (PUCCH) transmission and a physical uplink shared channel (PUSCH) transmission based on the information on the priority, in case that the PUCCH transmission and the PUSCH transmission are overlapped in time,
wherein the PUSCH transmission includes a grant free (GF) transmission without dynamic scheduling, and the PUCCH transmission includes an acknowledgement or a negative acknowledgment (ACK/NACK) transmission,
wherein the information on the priority for the GF transmission is configured based on configuration information for the GF transmission, and wherein, in case that the base station configures a type 1 GF transmission and a type 2 GF transmission for the terminal
a priority configured for the type 1 GF transmission is higher than a priority of an acknowledgement or a negative acknowledgment (ACK/NACK) transmission, and the priority of the ACK/NACK transmission is higher than a priority configured for the type 2 GF transmission.

17. The base station of claim 16,
wherein the PUCCH transmission further includes a scheduling request (SR) transmission.

18. The base station of claim 16,
wherein the controller is further configured to control the transceiver to receive, from the terminal, the PUCCH transmission of a high priority, in case that the PUCCH transmission of the high priority overlaps in time with the PUSCH transmission of a low priority.

19. The base station of claim 16,
wherein the controller is further configured to control the transceiver to receive, from the terminal, the PUSCH transmission of a high priority, in case that the PUSCH transmission of the high priority overlaps in time with the PUCCH transmission of a low priority.

20. The base station of claim 17,
wherein, in case that a plurality of SR resources are configured by the base station, the information on the priority for each SR transmission is determined based on information configuring each SR resource among the plurality of the SR resources.

* * * * *